US010043213B2

United States Patent
Straub et al.

(10) Patent No.: US 10,043,213 B2
(45) Date of Patent: Aug. 7, 2018

(54) SYSTEMS AND METHODS FOR IMPROVING COMPUTATION EFFICIENCY IN THE DETECTION OF FRAUD INDICATORS FOR LOANS WITH MULTIPLE APPLICANTS

(71) Applicant: LexisNexis Risk Solutions FL Inc., Boca Raton, FL (US)

(72) Inventors: Scott M. Straub, Silver Spring, MD (US); Samantha Gwinn, Washington, DC (US); Cindy Loizzo, Boca Raton, FL (US); Alex Woo Song, West Friendship, MD (US); Marlene Thorogood, Boca Raton, FL (US); Cheri Gay Nevin, Englewood, OH (US); Eric Piner, Miamisburg, OH (US)

(73) Assignee: LexisNexis Risk Solutions FL Inc., Boca Raton, FL (US)

(*) Notice: Subject to any disclaimer, the term of this patent is extended or adjusted under 35 U.S.C. 154(b) by 349 days.

(21) Appl. No.: 14/945,018

(22) Filed: Nov. 18, 2015

(65) Prior Publication Data

US 2016/0071208 A1    Mar. 10, 2016

Related U.S. Application Data

(63) Continuation-in-part of application No. 14/667,977, filed on Mar. 25, 2015, now abandoned, which is a
(Continued)

(51) Int. Cl.
*G07B 17/00* (2006.01)
*G06Q 40/02* (2012.01)
(Continued)

(52) U.S. Cl.
CPC ......... *G06Q 40/025* (2013.01); *G06Q 50/265* (2013.01)

(58) Field of Classification Search
USPC .......................................................... 705/30
See application file for complete search history.

(56) References Cited

U.S. PATENT DOCUMENTS 6,401,066 B1    6/2002   McIntosh
6,993,502 B1    1/2006   Gryglewicz et al.
(Continued)

OTHER PUBLICATIONS

Koh Hian C, Tan Wei C, Goh Chwee P. Credit Scoring Using Data Mining Techniques. Singapore Management Review [serial online]. Jul. 2004;26(2):25-47. Available from: Business Source Complete, Ipswich, MA.*
(Continued)

*Primary Examiner* — Ashford S Hayles
(74) *Attorney, Agent, or Firm* — Troutman Sanders LLP; James E. Schutz; Mark Lehi Jones

(57) ABSTRACT

Certain embodiments of the disclosed technology include systems and methods for increasing efficiency in the detection of identity-based fraud indicators associated with a loan application. A method is provided that includes receiving applicant data associated with a loan application having a plurality of applicants. The application data includes at least a name, a social security number, and a street address for each of the plurality of applicants. The method includes querying one or more databases with the applicant data; receiving a plurality of independent information in response to the querying; determining a validity indication of the applicant data; creating disambiguated applicant records; determining relationships among the disambiguated applicant records; scoring at least one parameter of the applicant data; determining one or more indicators of fraud based on
(Continued)

the scoring; and outputting, for display, one or more indicators of fraud.

20 Claims, 7 Drawing Sheets

Related U.S. Application Data continuation-in-part of application No. 14/170,892, filed on Feb. 3, 2014, now abandoned, which is a continuation of application No. 13/541,157, filed on Jul. 3, 2012, now Pat. No. 8,682,755.

(60) Provisional application No. 61/970,603, filed on Mar. 26, 2014.

(51) Int. Cl.
  *G06Q 50/26* (2012.01)
  *G06Q 40/00* (2012.01)

(56) References Cited

U.S. PATENT DOCUMENTS

| | | |
|---|---|---|
| 7,251,625 B2 | 7/2007 | Lee et al. |
| 7,333,635 B2 | 2/2008 | Tsantes et al. |
| 7,398,925 B2 | 7/2008 | Tidwell et al. |
| 7,458,508 B1 | 12/2008 | Shao et al. |
| 7,461,258 B2 | 12/2008 | Rolfe |
| 7,579,965 B2 | 8/2009 | Bucholz |
| 7,590,572 B2 | 9/2009 | Larson |
| 7,624,031 B2 | 11/2009 | Simpson et al. |
| 7,661,585 B2 | 2/2010 | Joao |
| 7,720,846 B1 | 5/2010 | Bayliss |
| 7,769,738 B2* | 8/2010 | Ramberg .......... G06F 17/30864 705/14.1 |
| 7,779,456 B2* | 8/2010 | Dennis ................ G06F 21/6245 705/52 |
| 7,904,337 B2* | 3/2011 | Morsa .................... G06Q 30/02 705/1.1 |
| 7,905,396 B2 | 3/2011 | Tidwell |
| 7,937,319 B2* | 5/2011 | Kennis ............. G06F 17/30569 705/35 |
| 8,055,518 B2* | 11/2011 | Prieston ................ G06Q 40/00 235/375 |
| 8,176,044 B2* | 5/2012 | Edala ............... G06F 17/30867 707/706 |
| 8,306,970 B2* | 11/2012 | Drubner ........... G06F 17/30424 702/181 |
| 8,381,120 B2* | 2/2013 | Stibel .................. G06Q 30/018 705/347 |
| 8,386,377 B1* | 2/2013 | Xiong .................... G06Q 20/04 455/550.1 |
| 8,423,434 B2 | 4/2013 | Ramsey et al. |
| 8,504,470 B1* | 8/2013 | Chirehdast ............ G06Q 40/00 705/38 |
| 9,324,119 B2* | 4/2016 | Singh .................... G06Q 10/06 |
| 9,836,510 B2* | 12/2017 | Love ................. G06F 17/3053 |
| 2002/0087364 A1* | 7/2002 | Lerner .................. G06Q 40/08 705/4 |
| 2003/0115459 A1* | 6/2003 | Monk .................... G06Q 50/26 713/168 |
| 2004/0010458 A1* | 1/2004 | Friedman ............ G06Q 10/10 705/35 |
| 2004/0064415 A1* | 4/2004 | Abdallah ............ G06Q 50/265 705/50 |
| 2004/0111377 A1* | 6/2004 | Teberg ................ G06Q 10/10 705/74 |
| 2005/0033690 A1* | 2/2005 | Antognini ............... G06K 1/121 705/40 |
| 2005/0096989 A1* | 5/2005 | Ostlund ................ G06Q 20/20 705/19 |
| 2005/0285721 A1* | 12/2005 | Bucholz .................. B60R 25/10 340/426.1 |
| 2006/0149674 A1* | 7/2006 | Cook ..................... G06Q 20/40 705/44 |
| 2006/0245622 A1* | 11/2006 | Tedesco ............. G06K 9/00624 382/115 |
| 2006/0293981 A1* | 12/2006 | McNelley .......... G06Q 20/3821 705/35 |
| 2007/0208681 A1* | 9/2007 | Bucholz ................ G08G 1/017 706/47 |
| 2007/0213992 A1* | 9/2007 | Anderson .......... G06Q 30/0185 705/35 |
| 2008/0046368 A1* | 2/2008 | Tidwell ............... G06Q 20/042 705/44 |
| 2008/0091591 A1* | 4/2008 | Egnatios ................ G06Q 20/10 705/38 |
| 2009/0006230 A1* | 1/2009 | Lyda ..................... G06Q 40/00 705/35 |
| 2009/0112754 A1* | 4/2009 | Seifert .................. G06Q 20/02 705/39 |
| 2009/0187500 A1* | 7/2009 | Wilson .................. G06Q 40/00 705/31 |
| 2009/0327006 A1* | 12/2009 | Hansan ................. G06Q 10/10 705/317 |
| 2010/0241558 A1* | 9/2010 | Chmielewski ..... G06Q 30/0185 705/38 |
| 2010/0257092 A1 | 10/2010 | Einhorn |
| 2010/0332362 A1* | 12/2010 | Ramsey ............ G06Q 10/0635 705/31 |
| 2011/0047628 A1* | 2/2011 | Viars ..................... G06Q 10/10 726/28 |
| 2011/0131052 A1* | 6/2011 | Bucholz ................ G06Q 10/10 705/1.1 |
| 2011/0191335 A1* | 8/2011 | Miller ............... G06F 17/30014 707/728 |
| 2012/0030080 A1* | 2/2012 | Slater .................... G06Q 40/00 705/35 |
| 2012/0123821 A1* | 5/2012 | Rickman ........... G06Q 10/0635 705/7.28 |
| 2012/0130853 A1* | 5/2012 | Petri .................. G06O 30/0609 705/26.35 |
| 2012/0159647 A1* | 6/2012 | Sanin ...................... H04L 51/32 726/28 |
| 2012/0197771 A1 | 8/2012 | Wilson et al. |
| 2012/0197879 A1 | 8/2012 | Edala et al. |
| 2012/0226591 A1 | 9/2012 | Ramsey et al. |
| 2012/0296925 A1* | 11/2012 | Mehra ................. G06F 17/2725 707/758 |
| 2013/0060809 A1 | 3/2013 | Drubner |
| 2013/0066826 A1 | 3/2013 | McDonald et al. |
| 2013/0218797 A1* | 8/2013 | Prichard .............. G06Q 50/265 705/325 |
| 2014/0007179 A1* | 1/2014 | Moore ................... G06F 21/316 726/1 |
| 2014/0058763 A1* | 2/2014 | Zizzamia ............... G06Q 40/08 705/4 |
| 2014/0279379 A1* | 9/2014 | Mahdi ................. G06Q 40/025 705/38 |
| 2015/0193781 A1* | 7/2015 | Dave .................. G06Q 30/0185 705/318 |
| 2015/0348041 A1* | 12/2015 | Campbell .......... G06Q 20/4016 705/44 |

OTHER PUBLICATIONS

Dejaeger K, Verbeke W, Martens D, Baesens B. Data Mining Techniques for Software Effort Estimation: A Comparative Study. IEEE Transactions on Software Engineering [serial online]. Feb. 2012;38(2):375-397. Available from: Computers & Applied Sciences Complete, Ipswich, MA.*

Shankar N. Automated Deduction for Verification. ACM Computing Surveys [serial online]. Oct. 2009;41(4):20:1-20:56. Available from: Business Source Complete, Ipswich, MA.*

Best, P.J. et al., "Continuous Fraud Detection in Enterprise Systems through Audit Trail Analysis," Journal of Digital Forensics, Security and Law, 2009, pp. 39-60, 4(1), ADFSL.

(56) References Cited

OTHER PUBLICATIONS

International Search Report and Written Opinion for International Application No. PCT/US2013/049045 dated Jan. 10, 2014.

* cited by examiner

SYSTEMS AND METHODS FOR IMPROVING COMPUTATION EFFICIENCY IN THE DETECTION OF FRAUD INDICATORS FOR LOANS WITH MULTIPLE APPLICANTS

CROSS REFERENCE TO RELATED APPLICATIONS

This application is a Continuation-in-Part under 37 C.F.R. 1.53(b) of U.S. Non-Provisional patent application Ser. No. 14/667,977, entitled "Systems and Methods for Estimating Probability of Identity-Based Fraud, filed 25 Mar. 2015, and published as U.S. Patent Publication No. 20150199784 on 16 Jul. 2015, the contents of which are hereby incorporated by reference in its entirety. U.S. Non-Provisional patent application Ser. No. 14/667,977 claims priority under 35 U.S.C. §119(e) to U.S. Provisional Patent Application No. 61/970,603, filed 26 Mar. 2014, entitled "Systems and Methods for Estimating Probability of Identity-Based Fraud," the contents of which are hereby incorporated by reference in its entirety. U.S. Non-Provisional patent application Ser. No. 14/667,977 is also a Continuation-in-Part under 37 C.F.R. 1.53(b) of U.S. Non-Provisional patent application Ser. No. 14/170,892, filed 3 Feb. 2014, and entitled "Systems and Methods for Detecting Fraud," published as U.S. Patent Application Publication No. US2014/0149304 on 29 May 2014, the contents of which are hereby incorporated by reference in its entirety. Application Ser. No. 14/170,892 is a Continuation of U.S. patent application Ser. No. 13/541,157, filed 3 Jul. 2012, and entitled "Systems and Methods for Detecting Tax Refund Fraud," and issued as U.S. Pat. No. 8,682,755 on 25 Mar. 2014, the contents of which are hereby incorporated by reference in its entirety.

The following applications are also incorporated by reference in their entirety, as if presented in full:

U.S. patent application Ser. No. 12/637,286, entitled "METHOD AND SYSTEM FOR LINKING AND DELINKING DATA RECORDS," filed 14 Dec. 2009, and published 15 Apr. 2010 as U.S. Patent Publication No. 20100094910, now U.S. Pat. No. 9,015,171, issued 1 Apr. 2015.

U.S. patent application Ser. No. 12/496,948, entitled "ENTITY REPRESENTATION IDENTIFICATION USING ENTITY REPRESENTATION LEVEL INFORMATION," filed 2 Jul. 2009, and published 14 Jan. 2010 as U.S. Patent Publication No. 20100010988, now U.S. Pat. No. 8,661,026, issued 25 Feb. 2014.

U.S. patent application Ser. No. 12/496,876, entitled "SYSTEM AND METHOD FOR IDENTIFYING ENTITY REPRESENTATIONS BASED ON A SEARCH QUERY USING FIELD MATCH TEMPLATES," filed 2 Jul. 2009, and published 7 Jan. 2010 as U.S. Patent Publication No. 20100005078, now U.S. Pat. No. 8,285,725, issued 9 Oct. 2012.

U.S. patent application Ser. No. 12/496,888, entitled "BATCH ENTITY REPRESENTATION IDENTIFICATION USING FIELD MATCH TEMPLATES," filed 2 Jul. 2009, and published 7 Jan. 2010 as U.S. Patent Publication No. 20100005056, now U.S. Pat. No. 8,484,211, issued 9 Jul. 2013.

U.S. patent application Ser. No. 12/188,742, entitled "DATABASE SYSTEMS AND METHODS FOR LINKING RECORDS AND ENTITY REPRESENTATIONS WITH SUFFICIENTLY HIGH CONFIDENCE," filed 8 Aug. 2008, and published 29 Oct. 2009 as U.S. Patent Publication No. 20090271424, now U.S. Pat. No. 8,266,168, issued 11 Sep. 2013.

FIELD

The disclosed technology generally relates to improving computation efficiency, and in particular, to improving computation efficiency in detecting identity-based fraud indicators for loans having multiple applicants.

BACKGROUND

Low-interest loans are available to students and parents through the Federal Direct Loan Program (FDLP) to help pay for the cost of a student's education after high school. The Health Care and Education Reconciliation Act of 2010 eliminated certain student loan programs that were funded by private lenders but guaranteed by the U.S. Government. The U.S. Department of Education currently oversees the FDLP program as the sole government-backed loan program in the United States; however, a large number of loans have been transferred to an online platform for servicing by a private corporation.

Whether loans are serviced by governmental or private entities, the adoption of online loan origination via the Internet has led to a growing number of problems associated with applicant misrepresentation and identity-based fraud. For example, fraudsters can apply for loans by misrepresenting their identity, by stealing and using identity information from another individual, or by using an identity of a deceased person. The associated costs that are passed-on to taxpayers can be significant. Technically well-informed fraud perpetrators with sophisticated deception schemes are likely to continue targeting student loan programs, particularly if fraud detection and prevention mechanisms are not in place. Significant challenges remain for balancing the threats of identity fraud with efficient loan origination and processing.

BRIEF SUMMARY

Some or all of the above needs may be addressed by certain embodiments of the disclosed technology. Certain embodiments of the disclosed technology may include systems and methods for increasing computation efficiency in the detection of identity-based fraud indicators for loans having multiple applicants.

According to an exemplary embodiment of the disclosed technology, a method is provided for receiving, from a first information source, applicant data associated with a loan application having a plurality of applicants. The applicant data includes at least a name, a social security number, and a street address for each of the plurality of applicants. The method includes: querying one or more of a public database and a private database with at least a portion of the applicant data; receiving, from a second information source that is independent of the first information source, a plurality of independent information in response to the querying; determining, with one or more computer processors in communication with a memory, based at least in part on a comparison of the applicant data with at least a portion of the plurality of independent information, a first validity indication of the applicant data; creating, with the one or more computer processors, disambiguated applicant records responsive to the first validity indication by one or more of: performing data cleansing on one or more of the applicant data and the plurality of independent information to eliminate one or more name variations; and adding metadata record to one or more of the applicant data and the plurality of independent information. The method includes determining, with the one or more computer processors, relationships among the disambiguated applicant records by one or more of: creating a core join data structure with at least a portion of all available disambiguated applicant records; splitting the core join data structure into persisted parts; and clustering one or more of the persisted parts and the disambiguated applicant records. The method further includes scoring, with the one or more computer processors and based at least in part on the determined relationships among the disambiguated applicant records, at least one parameter of the applicant data; determining, with the one or more computer processors, one or more indicators of fraud based on the scoring of the at least one parameter; and outputting, for display, one or more indicators of fraud.

According to an example implementation of the disclosed technology, the system includes at least one memory for storing data and computer-executable instructions; and at least one processor configured to access the at least one memory and further configured to execute the computer-executable instructions for processing the method described above.

Certain example implementations of the disclosed technology can include one or more computer readable media comprising computer-executable instructions that, when executed by one or more processors, configure the one or more processors to perform the method described above.

Other embodiments, features, and aspects of the disclosed technology are described in detail herein and are considered a part of the claimed disclosed technologies. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
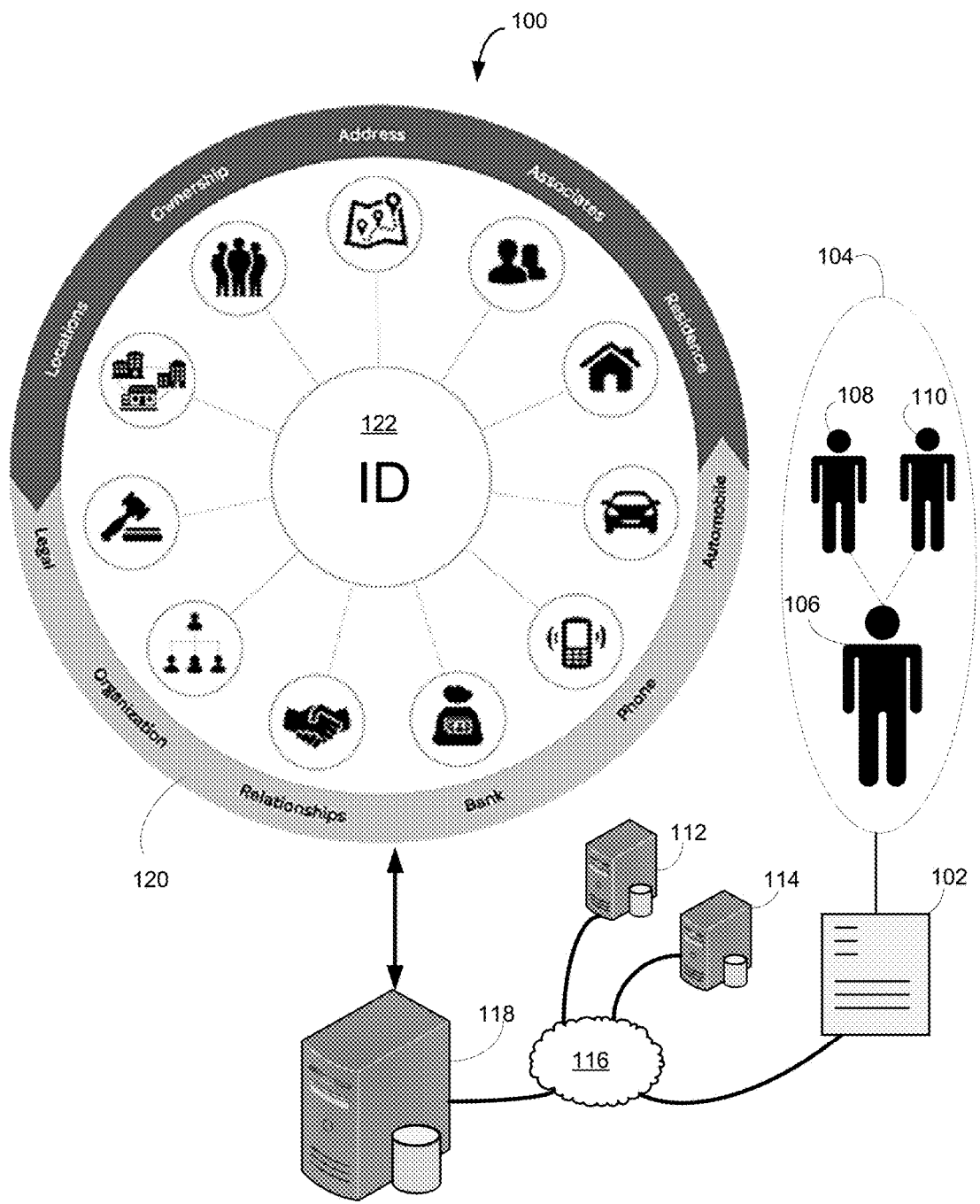
FIG. 1 depicts a system 100 for processing student loan applications to detect possible fraud, according to certain embodiments of the disclosed technology.

With the advent of the Internet, web-based portals for processing applications and originating loans are becoming more prevalent. Accordingly, the traditional human process of scrutinizing application information for validity is no longer able to adequately address the evolving problems associated with identity-based fraud in the Internet age. Certain aspects of the disclosed technology may address this problem.

In accordance with certain example implementations of the disclosed technology, various forms of identity-related fraud may be detected, for example, in a loan-origination process where multiple individuals are represented in the same application. For example, a student loan application may list a student and parents as applicants in the same loan application. Certain embodiments of the disclosed technology may apply in particular to the problem of identity-misrepresentation in the process of obtaining a student loan. However, certain example implementations may apply to loan processes that are not necessarily student or education related.

Certain example embodiments of the disclosed technology may utilize various models to build a profile of indicators of fraud that may be based on multiple variables associated with the multiple applicants. In certain example implementations of the disclosed technology, the interaction of the indicators and variables may be utilized to produce one or more scores indicating the likelihood or probability of fraud.

Example implementations of the disclosed technology can utilize special-purpose computing systems and custom query language(s) in the processes described herein to provide meaningful results, as may be necessitated due to the sheer amount of data that needs to be tracked and analyzed.

Certain example implementations of the disclosed technology provide tangible improvements in computer processing speeds, memory utilization, and/or programming languages. Such improvements provide certain technical contributions that can enable the detection of relationships, activities, locations, and associated data among individuals. In certain example implementations, the improved computer systems disclosed herein may enable analysis of an entire population, such as all known persons in the United States, together with associated activities, relationships, etc. The computation of such a massive amount of data, at the scale required to provide effective outlier detection has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective relationship-linking to detect certain fraudulent activities. As disclosed herein, the special-purpose computers and special-purpose programming language(s) disclosed herein can provide improved computer speed and/or memory utilization that provide an improvement in computing technology, thereby enabling the disclosed inventions.

Certain example implementations of the disclosed technology may be enabled by the use of a special purpose HPCC systems in combination with a special purpose software linking technology called Scalable Automated Linking Technology (SALT). SALT and HPCC, are developed and offered by LexisNexis Risk Solutions FL Inc., the assignee of the disclosed technology. HPCC Systems, for example, provide data-intensive supercomputing platform(s) designed for solving big data problems. The SALT modules, in conjunction with the HPCC Systems, can provide technical improvements in computer processing that enable the disclosed technology and can provide useful, tangible results that may have previously been unattainable. For example, certain example implementation of the disclosed technology may process massive data sets, which are computationally intensive, requiring special software and hardware.

One of the issues that has plagued previous "relationship determination" solutions involving massive data sets is the extremely long run-times and large amount of memory/disk space required. One of the technical solutions provided by the technology disclosed herein concerns the enablement and efficiency improvement of computer systems and software to process relationship data, and to provide the desired data in a reasonable amount of time. Certain example implementations of the disclosed technology may be utilized to increase the efficiency of detection of identity-based fraud indicators.

Determining relationships among records, for example, can follow the classical n-squared process for both time and disk space. According to an example implementation of the disclosed technology, SALT provides a process in which light-weight self-joins may be utilized, for example, in generating embeddable common lisp (ECL). However, disk-space utilization might still be high. Certain example implementations of the disclosed technology may enable a core join to be split into parts, each of which is persisted. This has the advantage of breaking a potentially very long join into n parts while allowing others a time slice. This has an effect of reducing disk consumption by a factor of n, provided the eventual links are fairly sparse. In terms of performance, it should be noted that if n can be made high enough that the output of each join does not spill to disk, the relationship calculation process may have significantly faster performance.

In accordance with certain example implementations, linking of records may be performed by certain additional special programming and analysis software. For example, record linking fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition, SALT may provide a general data ingest application which allows input files to be combined or merged with an existing base file. SALT may be used to generate a parsing and classification engine for unstructured data which can be used for data preparation. The data preparation steps are usually followed by the actual record linking or clustering process. SALT provides applications for several different types of record linking including internal, external, and remote.

Data profiling, data hygiene and data source consistency checking, while key components of the record linking process, have their own value within the data integration process and may be supported by SALT for leverage even when record linking is not a necessary part of a particular data work unit. Certain example implementations of the disclosed technology utilizes term specificity to determine the relevance/weight of a particular field in the scope of the linking process, and a mathematical model based on the input data, rather than the need for hand coded user rules, which may be key to the overall efficiency of the method.

Certain example implementations may utilize SALT to prevent fraud by verifying identities, addresses and other factors, and using information on relationships to see where collusive activities might exist within a student loan generation process.

In accordance with an example implementation of the disclosed technology, and as discussed above, a persistent data structure may be utilized as part of splitting a core join, for example, to increase the performance of the computer processor and/or to reduce the disc/memory utilization requirements in determining relationships among records. The persistent data structure, according to certain example implementations of the disclosed technology, is a data structure that preserves the previous version of itself when it is modified. Such data structures may be effectively immutable, as their operations do not update the structure in-place, but instead may yield a new updated structure. Certain example implementations may utilize a meld or merge operation that can create a new version from two previous versions. In certain example implementations, the persistent data structure(s) can also be created using in-place updating of data and these may, in general, use less time or storage space than their purely functional counterparts. In certain example implementations, persistence can be achieved by simple copying. Certain example implementations of the disclosed technology exploit a similarity between the new and old versions to share structure between versions.

Embodiments of the disclosed technology will be described more fully hereinafter with reference to the accompanying drawings, in which embodiments of the disclosed technology are shown. This disclosed technology may, however, be embodied in many different forms and should not be construed as limited to the embodiments set forth herein; rather, these embodiments are provided so that this disclosure will be thorough and complete, and will fully convey the scope of the disclosed technology to those skilled in the art.

FIG. 1 is a block diagram representation of an example system 100 in which information associated with a loan application 102 may be processed for detection of possible fraud, according to exemplary embodiments of the disclosed technology. In certain example implementations, data associated with an application 102 may be received "on-line" via a network 116 (for example, via the Internet) in contrast to traditional processes involving human processing, as was prevalent before the advent of the Internet.

In accordance with an example implementation of the disclosed technology, a plurality of individuals 106, 108, 110 may be listed or otherwise represented as applicants 104 on the application 102. For example, in the case of a student loan application, the primary applicant 106 may be a student, with one or more parents or guardians 108, 110 listed as co-applicants.

The listing of multiple applicants 104 on a loan application is common for several reasons. For example, a primary applicant 106 may have a limited, poor, or non-existent credit record, thus requiring one or more co-signers (108, 110) who are ultimately responsible for paying back the loan in the event that the primary applicant 106 defaults or is otherwise unable to repay the loan. In another example implementation, the availability of funds and/or a favorable interest rate may be based on an income level. For example, in the case of a student loan, one or more of the co-signers 108, 110 may be parents or legal guardians of the primary applicant 106 (i.e., the student) and the co-signers 108, 110 may list the primary applicant 106 as a dependent on their tax returns. Thus, the financial/income information associated with one or more co-signers 108, 110 may be utilized (or required) for the approval of the loan.

Identity-related fraud can be perpetrated in the loan-origination process when the application 102 includes misinformation associated with one or more of the applicants 104. Such misinformation can be very difficult (or even impossible) to detect using traditional methods. According to an example implementation of the disclosed technology, certain information may be provided in the application 102, such as first and last names, street addresses, and social security numbers. This information may be used as input for querying one or more private databases 112 and/or public 114 databases via a network 116. This input information may be utilized to find and return independent information that can be processed by a special-purpose computer 118 to assess the validity of the information provided in the application 102 and/or to assess the risk of identity-related fraud.

In accordance with an example implementation of the disclosed technology, the special-purpose computer 118 may include a HPCC system in combination with the special purpose SALT software linking technology, as discussed previously. For example, any or all of the information provided in the application 102 and/or the independent information returned by querying the one or more private/public databases 112, 114 may be utilized to determine the validity of information provided in the application 102. For example, the system 100 may utilize a multi-aspect process 120 (as depicted by the circular graphic in FIG. 1) to unambiguously identify (ID) 122 and validate the applicant(s) 104 and/or the associated information provided in the application 102. The process 120 may also be utilized to flag the application 102 when certain questionable or fraudulent indicators are detected.

As depicted in FIG. 1, the process 120 may utilize certain information about the applicants 104, including but not limited to residence addresses, previous addresses, real estate ownership, name variations, social security numbers, known associates, etc. In certain example implementations, additional information may be used. For example, city or county motor vehicle records, phone records, bank records, credit report records, legal records, employment records, etc. may be utilized. For example, in one aspect of the disclosed technology, addresses associated with one or more of the applicants 104 and their closest relatives or associates may be may be analyzed to determine distances between the addresses. A greater distance between addresses may indicate a higher the likelihood of fraud because, for example, a fraudster may conspire with a relative or associate in another city, and may assume that their distance may buffer them from detection.

Certain example embodiments of the disclosed technology may utilize profile information related to an entity's neighborhood. For example, information such as density of housing (single-family homes, versus apartments and condos), the presence of businesses, and the median income of the neighborhood may correlate with a likelihood of fraud. For example, entities living in affluent neighborhoods may be less likely to be involved with fraud, whereas dense communities with lower incomes and lower presence of businesses may be more likely to be associated with fraud.

Embodiments of the disclosed technology may assesses the validity of the input identity elements, such as the name, street address, social security number (SSN), phone number, date of birth (DOB), etc., to verify whether or not the applicant 104 input information received via the application 102 corresponds to real identities. Certain example implementations may utilize a correlation between the input SSN and the input address, for example, to determine how many times the input SSN has been associated with the input address via various sources. Typically, the lower the number that the input SSN has been associated with the input address, the higher the probability of fraud.

Certain example implementations of the disclosed technology may determine the number of unique SSNs associated with the input addresses. Such information may be helpful in detecting identity-related fraud, and may be helpful in finding fraud rings because the fraudsters may create multiple synthetic identities for the applications, but they may specify a particular address for receiving the loan funds.

Certain example implementations of the disclosed technology may determine the number of sources reporting the input SSNs with the input names. If such occurrences are rare, then this is an indication of another synthetic identity being created and used.

Certain example implementations may determine the number of SSNs associated with the identities in one or more private databases 112 and/or public databases 114. For example, if the SSN has been associated with multiple identities, then it is likely a compromised SSN and the likelihood of fraud increases.

According to an example implementation, the disclosed technology may be utilized to verify the validity of the input addresses. For example, if an input address has never been seen in public records, then it is probably a fake address and the likelihood of fraud increases Certain example implementations of the disclosed technology may be utilized to determine if any of the input data provided in the application 102 corresponds to a deceased person, a currently incarcerated person, a person having prior incarceration (and time since their incarceration), and/or whether the person has been involved in bankruptcy. For example, someone involved in a bankruptcy may be less likely to be a fraudster.

Certain embodiments of the disclosed technology may enable the detection of possible, probable, and/or actual identity-related fraud, for example, as associated with a loan application 102. Certain example implementations provide for disambiguating the application 102 input information and determining a likelihood of fraud. In accordance with an example implementation of the disclosed technology, input information associated with an application 102 may be processed, weighted, scored, etc., for example, to disambiguate the information. Certain implementations, for example, may utilize one or more input data fields to verify or correct other input data fields. In certain example implementations, disambiguation may involve a process of data cleansing, for example, by eliminating ambiguity and/or name variations. Certain example implementations of disambiguation may be performed by adding metadata records to the data set that unambiguously identify entities and allows for alternate names.

In an example implementation, information associated with the application 102 may be received by the system 100. In one example embodiment, the application 102 may include an applicant's 104 name, street address, and social security number (SSN), where the SSN has a typographical error (intentional or unintentional). In this example, one or more public or private databases may be searched to find reference records matching the input information. But since the input SSN is wrong, a reference record may be returned matching the applicant-supplied name and street address, but with a different associated SSN. According to certain example implementations, the applicant-supplied input information may be flagged, weighted, scored, and/or corrected based on one or more factors or attributes, including but not limited to: fields in the reference record(s) having field values that identically match, partially match, mismatch, etc, the corresponding applicant-supplied field values.

Example embodiments of the disclosed technology may reduce false positives and increase the probability of identifying and stopping fraud based on a customized identity-based fraud score. According to an example implementation of the disclosed technology, a model may be utilized to process identity-related input information against reference information (for example, as obtained from the one or more private and/or public databases 112 114) to determine whether the input identity being presented via the application 102 corresponds to a real identity, the correct identity, and/or a possibly fraudulent identity.

Certain example implementations of the disclosed technology may determine or estimate a probability of identity-based fraud based upon a set of parameters. In an example implementation, the parameters may be utilized to examine the input data, such as name, address, and social security number to determine if such data corresponds to a real identity. In an example implementation, the input data may be compared with the reference data, for example, to determine field value matches, mismatches, weighting, etc. In certain example implementations of the disclosed technology, the input data (or associated entity record) may be scored to indicate the probability that it corresponds to a real identity.

In some cases, a model may be utilized to score the input identity elements, for example, to look for imperfections in the input data. For example, if the input data is scored with a sufficiently high probability that it corresponds to a real identity, even though there may be certain imperfections in the input or reference data, once these imperfections are found, the process may disambiguate the data. For example, in one implementation, the disambiguation may be utilized to determine how many other identities are associated with the input SSN. According to an example implementation, a control for relatives may be utilized to minimize the number of similar records, for example, as may be due to Jr. and Sr. designations.

In an example implementation, the applicant-supplied input data may be utilized to derive a date-of-birth, for example, based on matching reference records. In one example implementation, the derived date-of-birth may be compared with the issue date of the SSN. If the dates of the SSN are before the DOB, then the flag may be appended for this record as possible indication of fraud.

Another indication of fraud that may be determined, according to an example implementation, when one or more of the applicant's 104 have previously been associated with a different SSN. In an example implementation, a "most accurate" SSN for an applicant 104 may be checked to determine whether the applicant 104 is a prisoner, and if so the record may be flagged. In an example implementation, the input data may be checked against a deceased database to determine whether the applicant 104 has been deceased for more than one or two years, which may be another indicator of fraud.

Certain embodiments of the disclosed technology may enable the detection of possible, probable, and/or actual identity theft-related fraud. In certain example implementations, the applicants 104 may be natural persons. In other example implementations, one or more of the applicants 104 may represented as a natural person, but may actually be associated with a synthetic identity.

In accordance with an example implementation of the disclosed technology, input information associated with a loan application 102 may be processed, weighted, scored, etc., for example, to disambiguate the information. Certain implementations, for example, may utilize one or more input data fields to verify or correct other input data fields.

In certain example implementations, data may be received from a first information source that is associated with one or more of the applicants 104. For example, the application 102 may contain certain identifying information received from one or more of the applicants 104, such as name, social security number, address, etc. This "application information" may be considered as coming from the first information source, either directly from the one or more of the applicants 104, or via a vendor, business, governmental agency, etc. According to an example implementation of the disclosed technology, independent data from a second information source may be received to check or verify the applicant-supplied data that is received from the first information source. In certain example implementations, the independent information from the second source is not provided by any of the one or more of the applicants 104. However, in certain example implementation, all or a part of the applicant-supplied information (such as received from the first information source) may be at least partially utilized in the generation of the independent information.

Example embodiments of the disclosed technology may reduce false positives and increase the probability of identifying and stopping fraud based on a customized identity theft-based fraud score. According to an example implementation of the disclosed technology, a model may be utilized to process identity-related input information against reference information (for example, as obtained from one or more private and/or public databases 112, 114) to determine whether the input identity being presented corresponds to a real identity, the correct identity, and/or a possibly fraudulent identity.

Certain example implementations of the disclosed technology may determine or estimate a probability of identity theft-based fraud based upon a set of parameters. In an example implementation, the parameters may be utilized to examine the input data or application 102 data, such as name, address, and social security number, for example, to determine if such data corresponds to a real identity. In an example implementation, the input data may be compared with the reference data, for example, to determine field value matches, mismatches, weighting, etc. In certain example implementations of the disclosed technology, the input data (or associated applicant record) may be scored to indicate the probability that it corresponds to a real identity.

Scoring:

In accordance with certain example embodiments of the disclosed technology, a score may be produced to represent how closely the loan application 102 input data matches with the reference data obtained from independent sources. As discussed above, the input data may correspond to the applicant-supplied information associated with loan application 102. The reference data, according to an example implementation, may be one or more records, each record including one or more fields having field values, and derived from one or more private and/or public databases 112, 114. In certain example implementations, the reference data may be the best data available, in that it may represent the most accurate data in the databases 112, 114. For example, the reference data may have been cross-verified among various databases, and the various records and/or fields may be scored with a validity score to indicate the degree of validity.

In certain example implementations of the disclosed technology, the scores that represent how closely input data matches with the reference data scores may range from 0 to 100, with 0 being worst and 100 being best. In other example implementations, a score of 255 may indicate a null value for the score, for example, to indicate that it is not a valid score and should not be read as indicating anything about the goodness of the match.

According to an example implementation, two types of scores may be utilized: hard scores and fuzzy scores, as known by those of skill in the art. Fuzzy scores, for example are dependent on multiple factors and the same score may mean different things.

In accordance with an example implementation, certain scores may be common across all types of verification scores. For example, a "0" may represent a very poor match, or a total mismatch, while a "100" may represent a perfect match. According to an example implementation a "255" may indicate a null (or invalid) comparison. In some cases, such a null designation may be due to missing data, either in the input data or in the reference data.

For example, a null in the address score may indicate certain types of invalid addresses or missing information, while a "100" may represent a perfect match across primary and secondary address elements. In certain example implementations of the disclosed technology, a score in the range of "1-90" may be representative of a fuzzy range of scores that mean primary elements of the address disagree in ways ranging from serious to minor. Higher scores are better, with 80 or higher generally considered a "good match" and lower scores increasingly less similar, and with "0" representing a total miss.

According to an example implementation, other scores may be dependent on the type of matching being done. For example, with regard to the phone number, a "255" may represent a blank input phone number, a blank reference phone number, or both being blank. In an example implementation, a "100" may indicate that the last seven digits of the input and reference phone numbers are an exact match, while a "0" may represent any other condition.

With regard to the SSN, and according to an example implementation a "255" may represent a blank input SSN, a blank reference SSN, or both being blank. In an example implementation, if neither of the SSNs (input or reference) are blank, then a computed score may be determined as 100 minus a 'similarity score'. For example, the computed scored may result in a perfect match of "100" if 'similarity score' is 0, and generally speaking, a very close match may result in a computed score of 80 or 90, while a 70 may be considered a possible match.

According to an example implementation, an applicant's date of birth (DOB) may be scored by comparing the input data with reference data. In one example implementation the standard format for dates may be represented by a year, month, day format (yyyymmdd). In certain example implementations of the disclosed technology, null values may be referenced or identified by scores of 00 or 01. In an example implementation, a "255" may represent invalid or missing DOB data in the input data, the reference data, or both while a "100" may represent a perfect yyyymmdd match. According to an example implementation, "80" may represent that yyyymm are the same and the day data (dd) is null in the input data, the reference data, or both. According to an example implementation, "60" may represent that yyyymm are the same, but the days are different in the input and reference data, but not null. According to an example implementation, "40" may represent that yyyy are the same, but mmdd in the input data, the reference data, or both is null. According to an example implementation "20" may represent that yyyy are the same, but the in the input data the reference data differ by month and day. Finally a "0" score may represent that there is no match between in the input DOB data and the reference DOB data.

With regard to the name, a "255" may represent a blank input name, a blank reference name, or both being blank, or no first, middle, or last name. Otherwise, the score may be computed similarly to SSN. For example, a name match algorithm may be applied to the input and reference names, and the various qualities of matches may range from a perfect match (with a verify score of 100) to a poor match (with a verify score of 50) to no match (with a score of 0).

Scoring Examples

In accordance with an example implementation, a name scoring may be utilized to determine how close the input names (first, middle and last) on the application 102 match to the reference name.

| Input Name | Best Name | Score |
|---|---|---|
| 'RICHARD L TAYLOR', | 'RICHARD L TAYLOR' | 100 |
| 'RICH L TAYLOR', | 'RICHARD L TAYLOR' | 90 |
| 'RICH TAYLOR', | 'RICHARD L TAYLOR' | 80 |
| 'ROD L TAYLOR', | 'RICHARD L TAYLOR' | 0, (believed to be another person). |

In an example implementation, the SSN score may be used to determine how similar the input SSN is to the reference SSN.

| Input SSN | Reference SSN | Score |
|---|---|---|
| 'ABCDEFGHI', | 'ABCDEFGHI', | 100 |
| 'ABCDEFGHZ', | 'ABCDEFGHI', | 90 |
| 'ABCDEFGZZ', | 'ABCDEFGHI', | 80 |
| 'ABCDEFZZZ', | ABCDEFGHI', | 70 |
| 'ABCDEZZZZ', | 'ABCDEFGHI', | 60 |
| 'ABCDZZZZZ', | 'ABCDEFGHI', | 40 |
| 'ZZZZZFGHI', | 'ABCDEFGHI', | 40 |

Certain embodiments of the disclosed technology may enable the detection of possible, probable, and/or actual fraud associated with a loan application 102. Embodiments disclosed herein may provide systems and methods for detecting identity misrepresentation, identity creation, or identity usurpation related to the application 102.

Exemplary embodiments of the disclosed technology may make a comparison of the applicant-supplied information with the plurality of independent information to determine zero or more indicators of fraud. For example, embodiments of the disclosed technology may compare the applicant-supplied information with the plurality of independent information to determine if one or more of the applicants 104 associated with the application 102 has died within a timeframe that would indicate a possible non-fraud scenario, but with no record of association between the applicant-supplied mailing address and the address information obtained via the independent information. Such a scenario may represent a situation where a fraudster has obtained a name and social security information from a deceased person, but where the address provided does not correspond with the known residence address of the deceased person, or with any known relatives or associates of the deceased person. This scenario may be an indicator of an attempt by a fraudster to have a payment sent to a post office box or other address that can be monitored by the fraudster without any direct tie to the fraudster. Exemplary embodiments of the disclosed technology may include a length of time entity has been deceased (if the entity is deceased) in the determination of fraud indicators. For example, an application 102 listing a person known to be dead for 10 years is very likely a fraudulent refund request.

According to another exemplary embodiment of the disclosed technology, a comparison may be made with the applicant-supplied mailing address and the independent information to determine if the applicant-supplied mailing address is invalid with no record of association between a zip code of the applicant-supplied mailing address and one or more zip codes associated with the independent address information. For example, situations exist where a legitimate applicant 104 may abbreviate or include a typographical error their mailing address, but they may provide a correct zip code that could be verified with the independent information. However, a fraudster may be likely to use a completely different zip code, and in such situations, embodiments of the disclosed technology may utilize the inconsistent zip code information to flag possible fraudulent activity.

According to another exemplary embodiment of the disclosed technology, a comparison may be made with the applicant-supplied mailing address and the independent information to determine whether or not there is any record of association between the applicant-supplied mailing address and any independent address information, such as the address of a relative, or associate. According to an exemplary embodiment, if there is no association between the applicant-supplied mailing address and any independent address information, then there is a high likelihood that the application 102 is fraudulent.

In accordance with certain exemplary embodiments of the disclosed technology, fraud false positive indicators may be determined, based at least in part on a comparison of the applicant-supplied information with the plurality of independent information. Absent of exemplary embodiments of the disclosed technology, certain situations may be incorrectly flagged as fraudulent, and may create costly and unnecessary delays related to the origination of the loan. In one exemplary embodiment, a fraud false positive indicator may be based on an analysis to detect if the applicant-supplied mailing address is invalid, but with a record of association between a zip code of the applicant-supplied mailing address and one or more zip codes associated with the independent address information. This represents a situation where a legitimate applicant 104 has abbreviated an address or included a typographical error in the address, but the zip code corresponds with one known to be associated with the legitimate applicant 104.

According to another exemplary embodiment, a fraud false positive indicator may be based on the applicant-supplied social security number when there is no independent information available. For example, in one exemplary embodiment, the applicant-supplied social security number may be checked to determine if it is valid and issued within 3 to 15 years, and the independent information can be checked to see if it includes information. If no independent information is available and if the applicant-supplied social security number is valid and issued within 3 to 15 years, then this information may provide an indication that the requesting entity is a minor. In another exemplary embodiment, the social security number may be checked to determine if the primary applicant is at least 24 years old with a valid social security number issued within 3 to 15 years, and the obtained independent information includes no information. In this scenario, exemplary embodiments of the disclosed technology may provide an indication that the requesting applicant is an immigrant.

As discussed previously, and according to exemplary embodiments of the disclosed technology, one or more private and/or public databases 112, 114 may be accessed to receive independent information. For example, one or more public records may be provide housing records, vehicular records, marriage records, divorce records, hospital records, death records, court records, property records, incarceration records, or utility records. In exemplary embodiments, the utility records may include one or more of utility hookups, disconnects, and associated service addresses. According to exemplary embodiments of the disclosed technology, such public records may be searched by social security number and/or name to provide independent information that can be utilized to verify applicant-supplied information. For example, applicant-supplied address information can be checked to determine if it corresponds to any addresses of relatives or associates of the entity.

According to certain exemplary embodiments of the disclosed technology, fraud associated with a loan application 102 may be detected by querying a Do Not Pay list with a combination of applicant-supplied information and independent information obtained from one or more public records. For example, a person may be listed on a Do Not Pay list for a number of reasons, including being incarcerated, not paying child support, having liens, etc. Persons on the Do Not Pay list may supply an incorrect social security number or a slight misspelling of a name to avoid being matched with the information on the Do Not Pay list.

An example implementation of the disclosed technology may include receiving applicant-supplied information that includes at least a name and a social security number and querying one or more public records with the applicant-supplied information. Certain exemplary embodiments of the disclosed technology may receive, based at least on the querying, public data that includes one or more of a second social security number or variant of a social security number associated with applicant-supplied name, a second name associated with the applicant-supplied social security number, or a name variant associated with the applicant-supplied social security number. For example, a variant may include information such as a name, a number, or an address, etc. that approximately matches real or legitimate information. A social security number variant, for example, may be nearly identical to a legitimate social security number, but with one or more numbers changed, transposed, etc.

Figure 2:
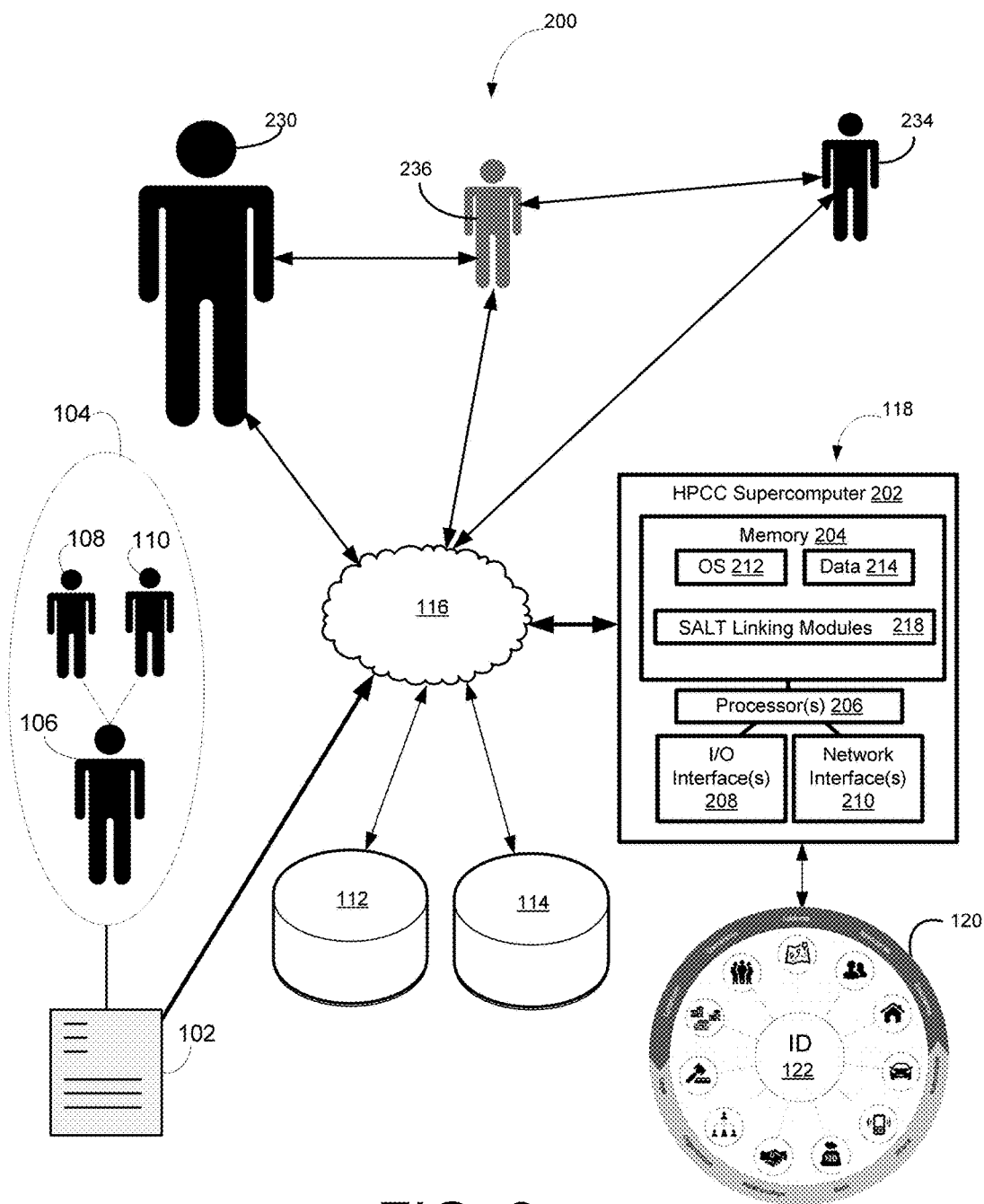
FIG. 2 is a block diagram 200 of an illustrative system 118 and process 120 for linking information from various data sources, according to an exemplary embodiment of the disclosed technology.

FIG. 2 is a block diagram 200 of an illustrative relationship-linking example that utilizes certain elements as previously described with respect to FIG. 1. For example, the special-computing system 118 may be utilized for determining relationship links between/among individuals. Certain example implementations of the special-computing system 118 may include the use of a special-purpose HPCC supercomputer 202 and SALT 218, as described above, and as provided with further examples in the APPENDIX.

According to an example implementation of the disclosed technology, the special-computing system 118 may include a computer 202 (for example an HPCC supercomputer) that may be in communication with one or more private databases 112 and/or one or more public databases 114 via a network 116 and the computing system 118 may be configured to process applicant-supplied data obtained from the application 102 as well as independent data obtained from the various databases 112, 114. According to an exemplary embodiment, the computer 202 may include a memory 204, one or more processors 206, one or more input/output interface(s) 208, and one or more network interface(s) 210. In accordance with an exemplary embodiment, the memory 204 may include an operating system 212 and data 214. In certain example implementations, one or more record linking modules, such SALT 218 may be provided, for example, to instruct the one or more processors 206 for analyzing relationships within and among the records. In certain example implementations, the records may be provided by the various databases 112, 114 in communication with the computer 202 directly and/or via a network 116 such as the Internet.

According to an example implementation of the disclosed technology, records of a population may be processed 120 to determine relationships and/or connections with a target individual 230, who may correspond to one of applicants 104, including but not limited to a primary applicant 106 (such as a student) and/or one of the co-applicants 108, 110 (such as one or more parents). In accordance with an example implementation of the disclosed technology, the analysis may yield other individuals 234, 236 who are directly or indirectly associated with the target individual 230. In certain example implementations, such relationships may include one or more of: one-way relationships, two-way relationships, first degree connections, second degree connections etc., depending on the number of intervening connections.

The example block diagram 200 and system 118 shown in FIG. 2 depicts a first individual 236 who is directly associated with the target individual 230 by a first-degree connection, such as may be the case for a spouse, sibling, known business associate, etc. Also shown, for example purposes, is a second individual 234 who is associated with the target individual 230 via a second degree connection, and who also is connected directly with the first individual 236 by a first degree connections. According to an exemplary embodiment, this type of relationship would tend to add more weight, verification, credibility, strength etc., to the connections. Put another way, such a relationship may strengthen the associated connection so that it may be considered to be a connection having a degree less that one, where the strength of the connection may be inversely related to the degree of the connection.

Certain example implementations of the disclosed technology may return records with IDs 122 corresponding to known relatives and/or possible associates of all submitted applicants 104 on the application 102. Certain example implementations, may record such IDs 122 in separate table to be processes in a later step. In one example implementation, all of these returned IDs 122 may be scanned (for example, vertically) throughout the entire file to identify instances where one identity, real or synthetic, has appeared multiple times on other submitted applications, as such IDs 122 may be associated with fraudulent activities.

Various embodiments of the communication systems and methods herein may be embodied in non-transitory computer readable media for execution by a processor. An exemplary embodiment may be used in an application of a mobile computing device, such as a smartphone or tablet, but other computing devices may also be used.

Figure 3:
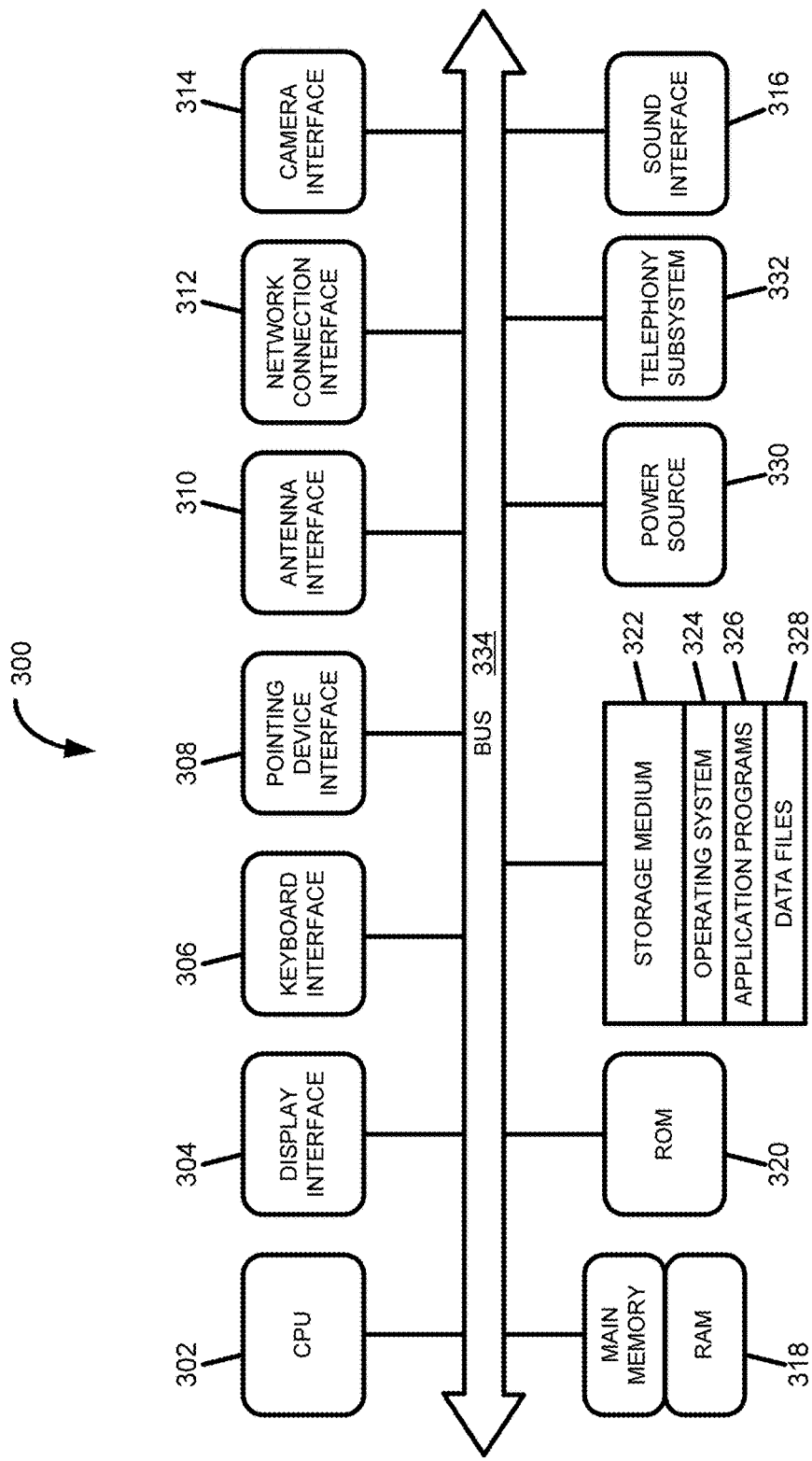
FIG. 3 is a block diagram of an illustrative computing system 300 according to an exemplary embodiment of the disclosed technology.

FIG. 3 depicts a block diagram of an illustrative computer system 300 and/or architecture according to an exemplary embodiment of the disclosed technology. Certain aspects of FIG. 3 may also be embodied in the supercomputer 202, as shown in FIG. 2. It will be understood that the architecture illustrated in FIG. 3 is provided for exemplary purposes only and does not limit the scope of the various embodiments of the communication systems and methods. In certain example implementations, the computing device or system 300 may be a specialized HPCC Systems, as developed and offered by LexisNexis Risk Solutions FL Inc., the assignee of the disclosed technology. HPCC Systems, for example, provide data-intensive supercomputing platform(s) designed for solving big data problems. Various implementations and methods herein may be embodied in non-transitory computer readable media for execution by a processor.

The architecture 300 of FIG. 3 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or touch screen. Exemplary embodiments of the system 300 may include an antenna interface 310 that provides a communication interface to an antenna; a network connection interface 312 that provides a communication interface to a network. In certain embodiments, a camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to exemplary embodiments, a random access memory (RAM) 318 is provided, where computer instructions and data are stored in a volatile memory device for processing by the CPU 302.

According to an exemplary embodiment, the architecture 300 includes a read-only memory (ROM) 320 where invariant low-level systems code or data for basic system functions such as basic input and output (I/O), startup, or reception of keystrokes from a keyboard are stored in a non-volatile memory device. According to an exemplary embodiment, the system 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, Knowledge Engineering Language, SALT, a web browser application, a widget or gadget engine, and or other applications, as necessary) and data files 328 are stored. According to an exemplary embodiment, the architecture 300 includes a power source 330 that provides an appropriate alternating current (AC) or direct current (DC) to power components. According to an exemplary embodiment, the system 300 includes and a telephony subsystem 332 that allows the device 300 to transmit and receive sound over a telephone network. The constituent devices and the CPU 302 communicate with each other over a bus 334.

In accordance with exemplary embodiments, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers. More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one exemplary configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 300 to access computer-executable process steps, application programs and the like, stored on removable and non-removable memory media, to off-load data from the system 300 or to upload data onto the system 300. A computer program product, such as one utilizing a communication system may be tangibly embodied in storage medium 322, which may comprise a machine-readable storage medium.

In accordance with an example implementation of the disclosed technology, the special-purpose hardware and instruction set may enable processing of a massive number of records to detect indicators of fraudulent activity. In some instances, the number of records when the initial data build is assembled, can approach or exceed 3 billion records in number. In accordance with an example implementation of the disclosed technology, these records may be processed by SALT to produce a relative build that can result in even more records and relationships. For example, in some instances, the number of records in the relative build can approach or exceed 30 billion records in number.

In accordance with an example implementation of the disclosed technology, the relative build records may be post-processed to provide a reduced set of records (for example approximately 14 billion records). This reduction in the number of records can be a result of eliminating duplicates, scrubbing data, correcting data errors, removing records having low accuracy or linkage confidence etc. In certain example implementations, the reduced set of records can include relationship type, relationship history, linkages among individual IDs, etc. In accordance with an example implementation, relationship linking may be calculated via graph analytics with the Knowledge Engineering Language (KEL) and/or SALT, as previously discussed, which may provide certain speed, efficiency, and/or memory utilization advantages over previous computation languages.

Certain example implementations of the disclosed technology may enable identification of errors in data. For example, data provided by information vendors can include errors that, if left undetected, could produce erroneous results. Certain example implementations of the disclosed technology may be used to measure the accuracy and/or quality of the available data, for example by cross-checking, so that the data be included, scrubbed, corrected, or rejected before utilizing such data in the full analysis. In accordance with an example embodiment of the disclosed technology, such data quality may be determined and/or improved by one or more of cross checking, scrubbing to correct errors, and scoring to use or reject the data.

In accordance with an example implementation of the disclosed technology, connections and degrees of separation between entities may be utilized. For example, the connections may include a list of names of known or derived business associates, friends, relatives, etc. The degrees of separation may be an indication of the strength of the connection. For example, two people having a shared residence may result in a connection with a degree of one. In another example implementation, two people working for the same company may have a degree of two. In one example implementation, the degree of separation may be inversely proportional to the strength of the connection. In other example embodiments, different factors may be contribute to the degree value, and other values besides integers may be utilized to represent the connection strength.

Figure 4:
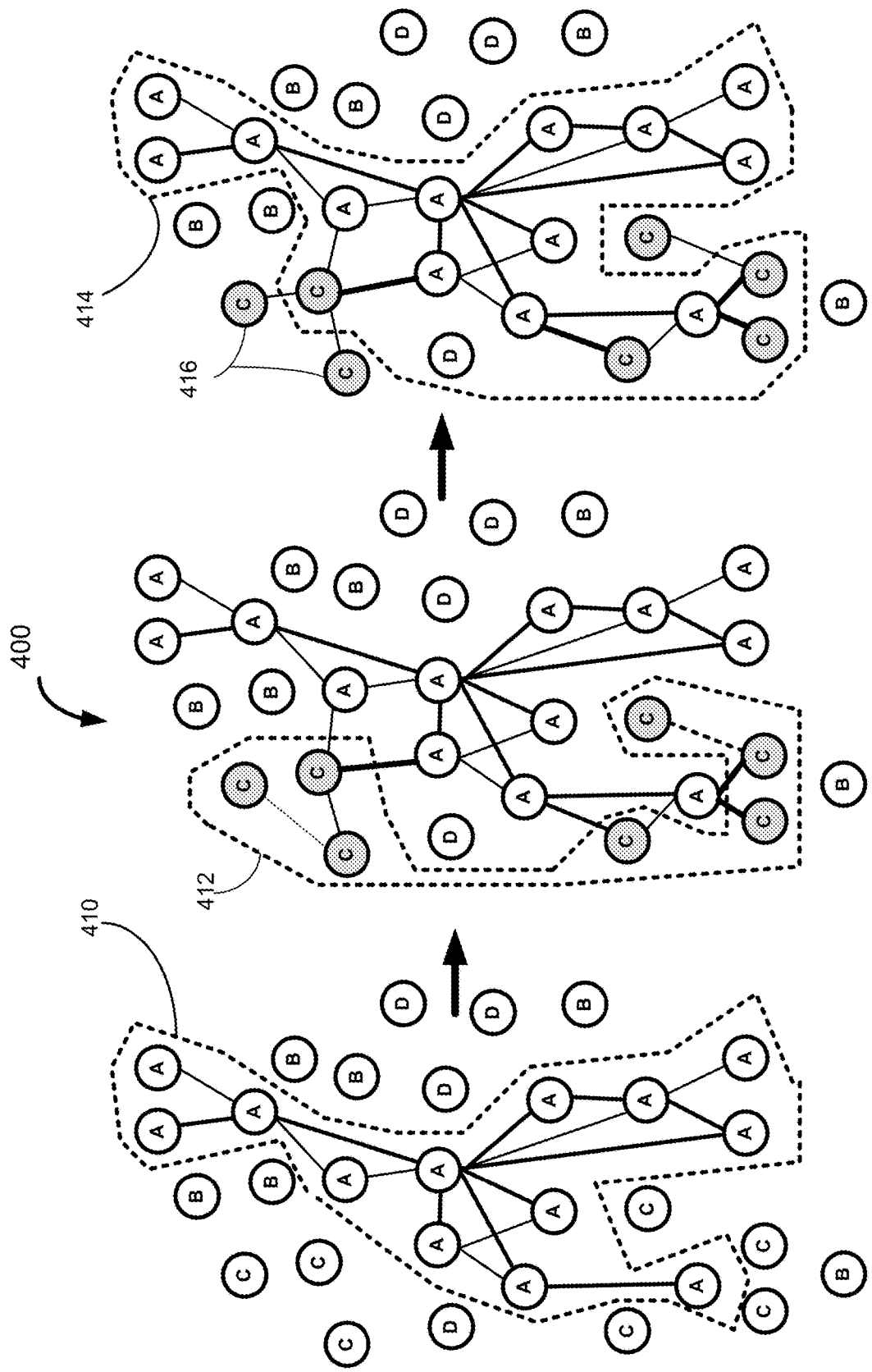
FIG. 4 is an illustrative example process 400 for clustering certain applicant data, according to an exemplary embodiment of the disclosed technology.

FIG. 4 is a graphical example of a clustering and co-convergence process, according to an example implementation of the disclosed technology. The circles shown in FIG. 4 may depict available database record representations corresponding to two or more different attributes or aspects (A, B, C, D . . . ). Such records may be in a single record set, or they may be received or otherwise derived from two or more record sets or sources. Such database record representations may be processed to determine linkages or relationships among the records and/or entities. The "relationships" among the various records (nodes) may be represented (for illustration purposes) as connecting lines (edges), with line weights representing different types of relationships and/or weightings among field values of the database records.

In certain example embodiments, each of the record data representations (circles or nodes) may include or represent multiple fields (not shown in FIG. 4), and may therefore be represented as nodes in a hyperspace. In one example implementation, the record data representations may relate to entities, such as people, and may include fields (such as Last Name, First Name, Address, Social Security Number, etc.,) with corresponding field values (such as Smith, John, 45 Broad Street, 543-21-1111). In another example implementation, the record data representations may represent entities such as an organization, and may include fields such as corporate offices, branches, locations, products, managers, employees, etc., with corresponding field values. In other example embodiments, the record data representations may include data representations from two or more different record sets. For example, the data may include representations from one set of records that represent people (with fields such as Last Name, First Name, Address, Social Security Number, etc.,) and the data may include representations from another set of records that represent businesses (with fields such as corporate offices, branches, locations, products, etc.).

According to certain example implementations, each available record data representation may correspond to an entity representation and may include a plurality of fields, each field configured to contain a field value, and each field value assigned a field value weight corresponding to a specificity of the field value in relation to all field values in a corresponding field of the records.

In accordance with an example implementation, for any particular given record attribute, the general process of clustering records may be refined with each iteration by assuming that all the other records and relationships are correct, performing one clustering iteration, then moving on to the next record attribute, performing one clustering iteration, and so forth. For example, the record data representations may be evaluated with respect to a particular attribute and/or aspect, and a cluster of records may be identified as having certain quantitative or qualitative relationships to the particular attribute of interest.

An example of an initial cluster 410 is depicted in the left-hand side of FIG. 4 within the dotted outline to distinguish the records having similar aspects or attributes of the cluster 410 from the remaining records. The initial clustered records 410, as depicted in this example, are shown sharing a common attribute identifier: "A," along with connection weights that may represent any number of scenarios, according to certain example embodiments of the disclosed technology. For example, the "A" identifier and the connecting edges may represent certain commonalities with respect to the identifier evaluated in the clustering iteration (such as exact or partial matches of a last name).

The middle cluster in FIG. 4 depicts another cluster in which a new cluster 412 is formed having records identified with "C" attributes or aspects. The right-hand cluster in FIG. 4 represents a re-clustering iteration process, according to an example implementation of the disclosed technology, in which records are identified with both "A" and "C" attributes or aspects to form a new cluster 414 To arrive at the new cluster 414 (and not explicitly shown in FIG. 4), example embodiments may utilize a first iteration process whereby records with "A" attributes are clustered while noting relationships (edges and weights, for example) between those records having "C" attributes, and vice-versa. For example, starting with the initial cluster 410, attributes or commonalities (represented by connecting edges) may be evaluated to aggregate one or more relationships between any two entities. As depicted in 410, and based on relationships and/or other criteria among the records, the new cluster 414 formed in the re-clustering step may include certain records of the first iteration clusters 410 412 while omitting certain records 416.

In general terms, and in accordance with an example implementation, the available records may be initially clustered into a first set of clusters having corresponding first cluster identifications (IDs), and each record may include one or more field values. For example, records may be clustered according to the various identifications, such as "A," "B," "C," "D," etc., as indicated in FIG. 4. In accordance with an example implementation, and as discussed above, the initial clustering iteration(s) may be based at least in part on determining similarity among corresponding field values of database records. In an example implementation, mutually matching records may be associated by performing at least one matching iteration for each of the records, based at least in part on the cluster IDs. In an example implementation, the matching iteration may include linking related database records based at least in part on a determined match value. In another example implementation, the matching iteration may include linking related database records, based at least in part on determined mutually preferred records. In an example implementation, the clustering may include a process of determining similarity among corresponding field values of the database records.

According to an example implementation of the disclosed technology, the iteration process may include re-clustering at least a portion of the database records into a second set of clusters (for example, the cluster 414) having a corresponding second cluster ID. In an example implementation, the re-clustering may be based, at least in part, on associating mutually matching attributes of the initial clusters. In another example implementation, the re-clustering may be based, at least in part, on determining similarity among corresponding field values of the database records.

In one example implementation, the initial clustering may include associating mutually matching database records, which may include determining highest compelling linkages among the database records, which may further include identifying mutually preferred pairs of records from the database records, each mutually preferred pair of records consisting of a first record and a second record, the first record consisting of a preferred record associated with the second record and the second record consisting of a preferred record associated with the first record. In an example implementation, the mutually preferred pairs of records may be assigned a match score that meets pre-specified match criteria.

In an example implementation, the iteration process may also include assigning, for each record from the database records, at least one associated preferred record, wherein a match value assigned to a given record together with its associated preferred record is at least as great as a match value assigned to the record together with any other record in the database records. In an example implementation, the iteration process may also include forming and storing a plurality of entity representations in the database, each entity representation of the plurality of entity representations including at least one linked pair of mutually preferred records.

According to an example implementation of the disclosed technology, determining similarity among the corresponding field values of the records may include assigning a hyperspace attribute to each record. The hyperspace attribute that corresponds to two database records may correlate with a similarity of the corresponding field values of the two database records. In certain example embodiments, membership of each database record in a plurality of hyperspace clusters may be determined based at least in part on the hyperspace attributes. According to an example implementation each record may be assigned a cluster ID and a match value reflecting a likelihood that the record is a member of a particular hyperspace cluster, and related records may be linked based at least in part on the cluster ID and match value (as depicted by the edges joining the nodes in FIG. 4). Determining membership of each database record in the plurality of hyperspace clusters, for example, may include creating a plurality of nodes at random locations in hyperspace, each node maintaining records in hyperspace based on the hyperspace attribute for which it is the closest node.

In accordance with certain implementations of the disclosed technology duplicate records (for example, ones that are likely to represent the same entity) may be eliminated by merging those database records that have hyperspace attribute differences within a predefined criteria, resulting in a reduced set of database records. In accordance with an example implementation, the process may further include recalculating the field value weights for the reduced set of database records, and re-clustering the reduced set of records based at least in part on the recalculated field value weights.

According to an example implementation, of the disclosed technology, the clustering, iterating, recalculating, and re-clustering etc. may produce a set of refined clusters in which the records in a given set possess criteria that resemble the other records in the set. Such clustering may provide useful characteristics, categories, structures, etc., for understanding the interrelations among records in a database, and may further be used to define characteristics, categories, structures, etc., for new data as it becomes available.

Figure 5:
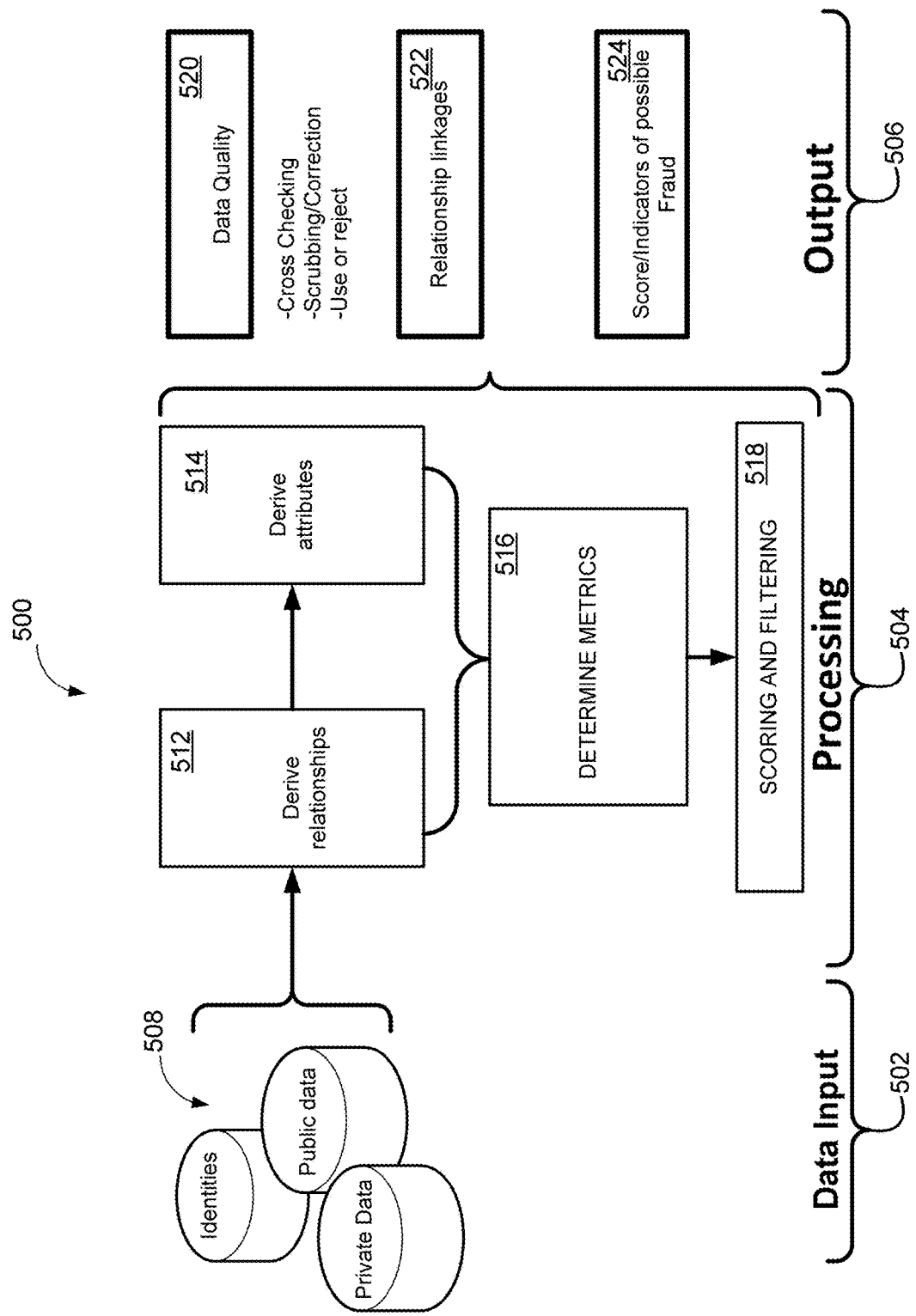
FIG. 5 is a block diagram 500 of an illustrative linking process, according to an exemplary embodiment of the disclosed technology.

FIG. 5 is a block diagram 500 depicting an example linking process, which may include phases, such as data input 502, processing 504, and output 506. According to an example embodiment, a plurality of data sources and types 508 may be utilized to derive relationships 512 and attributes 514 among associated records. In certain example implementations, the relationships 512 and attributes 514 may be used to determine metrics 516, and such metrics may be utilized for scoring and filtering 518 the records and associated data.

In an example implementation, the output 506 may be based on data quality 520, and may include relationship linkages 522. In certain example implementations, indicators of possible fraud 524 may be output. According to an example implementation of the disclosed technology, the indicators of possible fraud 524 may be based on additional scoring. In an example implementation, a scoring unit may utilize a predetermined scoring algorithm for scoring some or all of the data. In another example implementation, the scoring unit may utilize a dynamic scoring algorithm for scoring some or all of the data. The scoring algorithm, for example, may be based on seemingly low-risk events that tend to be associated with organizations, such as fraud organizations. The algorithm may thus also be based on research into what events tend to be indicative of fraud in the industry or application to which the system is directed.

In accordance with an example implementation of the disclosed technology, publicly available data may be utilized as input data 508, which may include several hundred million records. Certain example implementations may clean and standardize data to reduce the possibility that matching entities are considered as distinct. Before creating a graph, certain example implementations may use this data to build a large-scale network map of the population in question with associated attributes, linkages, relationships, etc.

According to an example implementation, and as previously described, the relatively large-scale of supercomputing power and analytics may enable identifying organized collusion. Example implementation of the disclosed technology of the systems and methods disclosed herein may rely upon large scale, special-purpose, parallel-processing computing platforms to increase the agility and scale of the solutions.

Example implementations of the disclosed technology of the systems and methods disclosed herein may measure behavior, activities, and/or relationships to actively and effectively expose syndicates and rings of collusion. Unlike many conventional systems, the systems and methods disclosed herein need not be limited to activities or rings operating in a single geographic location, and it need not be limited to short time periods. The systems and methods disclosed herein may be used to determine whether activities fall within an organized ring or certain geographical location.

In one example implementation, a filter may be utilized to reduce the data set to identify groups that evidence the greatest connectedness based on the scoring algorithm. In one example implementation, systems and methods disclosed herein may utilize scores that match or exceed a predetermined set of criteria may be flagged for evaluation. In an example implementation of the disclosed technology, filtering may utilize one or more target scores, which may be selected based on the scoring algorithm. In one example implementation, geo-social networks having scores greater than or equal to a target score may be flagged as being potentially collusive.

Figure 6:
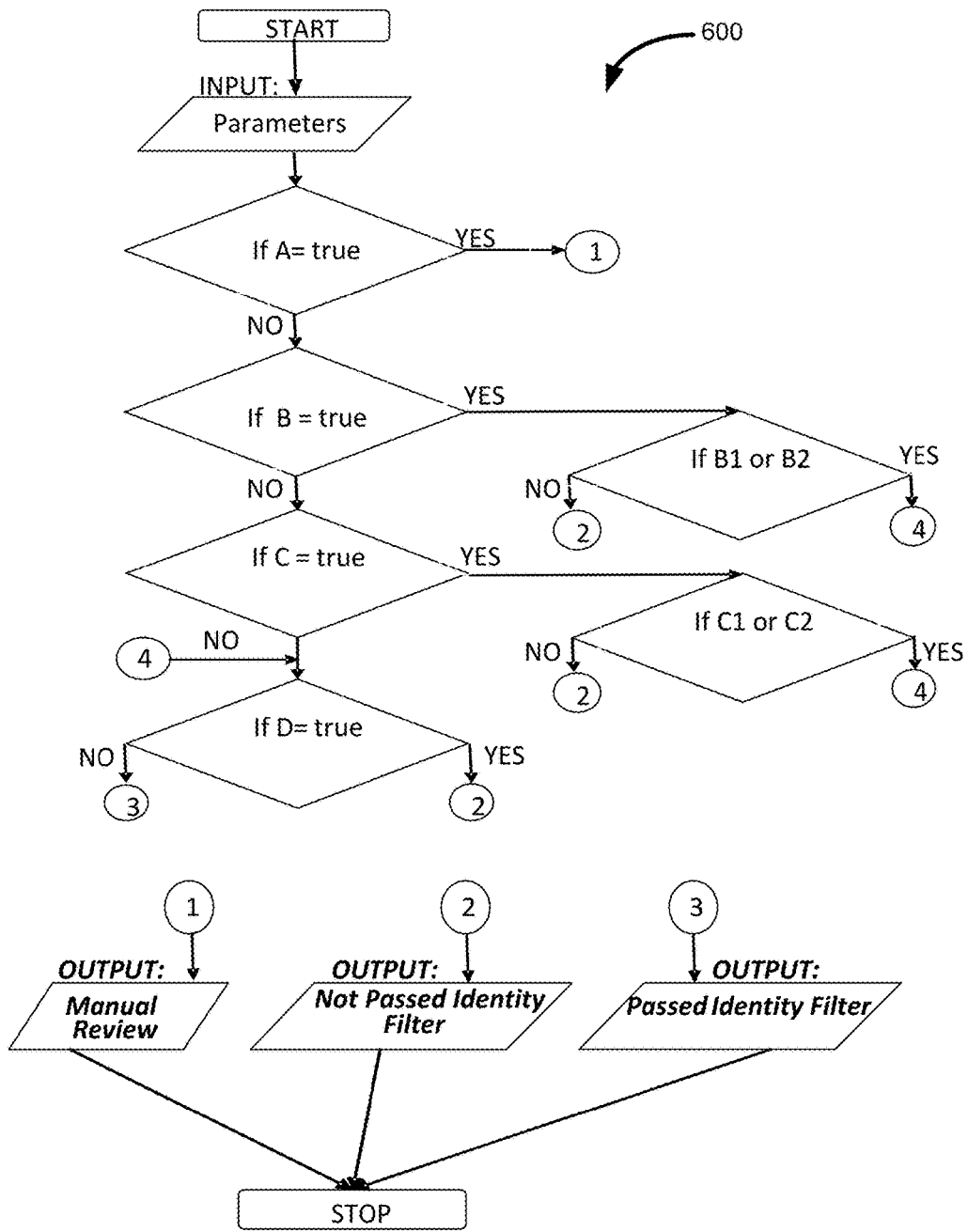
FIG. 6 is a flow diagram of a process 600 according to an exemplary embodiment of the disclosed technology.

FIG. 6 depicts a flow diagram 600, according to an example process implementation. The flow diagram 600 may be utilized to test the input data, for example, so that a determination may be made, with a computer processor, as to whether or not the identity associated with and represented by the input data in passes certain tests. For example, as shown in FIG. 6, input parameters and/or attributes associated with the input data may be tested based on a number of variables, scored, and sorted in to records that pass the identity filter tests, records that do not pass the identity filter tests, and records that may require manual review.

Attribute Examples

Table 1 lists some of the attributes, descriptions, and example relative order of importance with respect to determining indicators of fraud, according to an example implementation of the disclosed technology. In accordance with certain example implementations, such attributes may be utilized for the various tests in conjunction with the flow diagram 600 as shown in FIG. 6. For example, the attribute VariationSearchAddrCount may be tested to see if it is associated with >2 addresses, and if so (and perhaps depending on other such tests with other attributes), the record may be flagged as not passing the identity filter test, and thus, may be an indicator of fraud.

TABLE 1

| Example Order of Importance | Attribute | Attribute Description |
| --- | --- | --- |
| 1 | CorrelationSSNAddrCount | Total number of sources reporting input SSN with input address |
| 2 | AssocDistanceClosest | Distance in miles between identity and closest first-degree relative or associate |
| 3 | SearchUnverifiedAddrCountYear | Number of searches in the last year for the identity using an address that was not on the identity's file at the time of the search |
| 4 | VariationSearchAddrCount | Total number of addresses associated with the identity in searches |
| 5 | AddrChangeDistance | Distance in miles between input address and the most recent unique address |

TABLE 1-continued

| Example Order of Importance | Attribute | Attribute Description |
|---|---|---|
| 6 | IDVerRiskLevel | Indicates the fraud-risk level based on how well the input components match the information found for the input identity |
| 6a | IDVerSSN | Indicates if the SSN is verified |
| 6b | IDVerName | Indicates if the identity's name is verified |
| 6c | IDVerAddress | Indicates if the input address is verified |
| 6d | IDVerPhone | Indicates if the input phone is verified |
| 7 | DivAddrSSNCount | Total number of unique SSNs currently associated with input address |
| 8 | BankruptcyAge | Time since most recent bankruptcy filing |
| 9 | CorrelationSSNNameCount | Total number of sources reporting input SSN with input name |
| 10 | PBProfile | Profile of purchase activity |
| 11 | VariationSearchSSNCount | Total number of SSNs associated with the identity in searches |
| 12 | ValidationSSNProblems | Indicates SSN validation status - Deceased |
| 13 | CriminalCount | Total criminal convictions |
| 14 | InputAddrNBRHDMultiFamilyCount | Total number of multi-family properties in neighborhood |
| 14a | InputAddrNBRHDSingleFamilyCount | Total number of single family properties in neighborhood |
| 14b | InputAddrNBRHDBusinessCount | Total number of businesses in neighborhood |
| 15 | CurrAddrMedianIncome | Current address neighborhood median income based on U.S. Census data |
| 16 | ValidationAddrProblems | Indicates input address validation status - Invalid |
| 17 | SourceProperty | Indicates if identity is associated with the ownership of real property |
| 18 | InputAddrDelivery | Indicates the delivery sequence status of the input address - Vacant |
| 19 | SearchUnverifiedDOBCountYear | Number of searches in the last year for the identity using a date of birth that was not in the identity's record at the time of search |
| 20 | ArrestAge | Time since most recent arrest |
| 21 | SourceEducation | Indicates if identity attended or is attending college |
| 22 | InputAddrDwellType | Indicates input address dwelling type |
| 23 | AssocHighRiskTopologyCount | Total count of first-degree relatives or associates that are reported from high risk sources |
| 24 | SourceAssets | Indicates if identity is associated with the ownership of assets (vehicles, watercraft, and aircraft) |
| 25 | ValidationSSNProblems | Indicates SSN validation status - Invalid |
| 26 | SourcePhoneDirectoryAssistance | Indicates if identity has a phone listing in Electronic Directory Assistance (EDA) |

Figure 7:
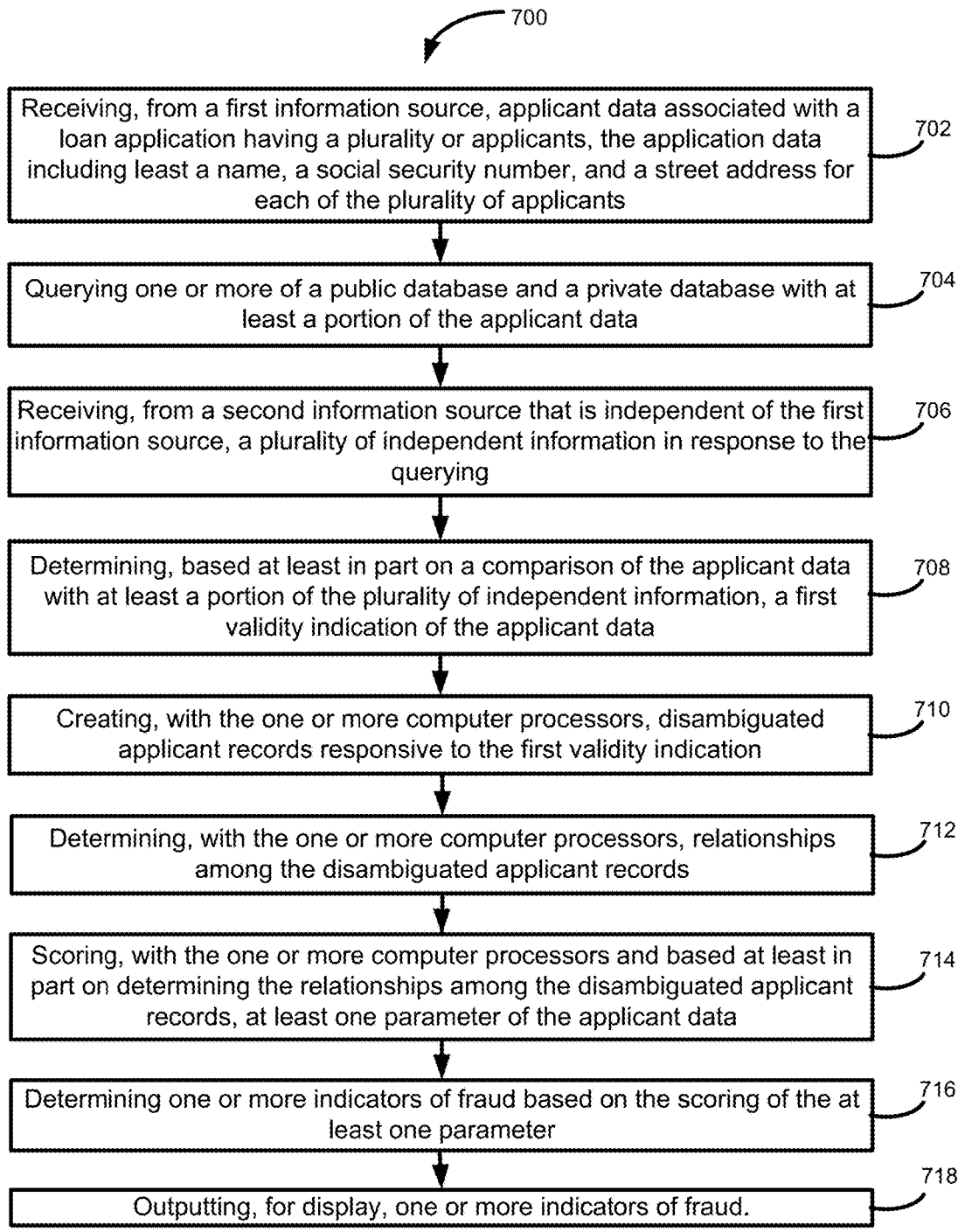
FIG. 7 is a flow diagram of a method 700 according to an exemplary embodiment of the disclosed technology.

An exemplary method 700 that may be utilized, for example, to increase computing efficiency, reduce time, reduce memory utilization, and/or to increase the accuracy in the detection of identity-based fraud indicators associate with a multi-applicant loan, will now be described with reference to the flowchart of FIG. 7. The method 700 starts in block 702, and according to an exemplary embodiment of the disclosed technology includes receiving, from a first information source, applicant data associated with a loan application having a plurality of applicants, wherein the applicant data comprises at least a name, a social security number, and a street address for each of the plurality of applicants. In block 704, the method 700 includes querying one or more of a public database and a private database with at least a portion of the applicant data. In block 706, the method 700 includes receiving, from a second information source that is independent of the first information source, a plurality of independent information in response to the querying. In block 708, the method 700 includes determining, with one or more computer processors in communication with a memory, based at least in part on a comparison of the applicant data with at least a portion of the plurality of independent information, a first validity indication of the applicant data. In block 710, the method 700 includes creating, with the one or more computer processors, disambiguated applicant records responsive to the first validity indication. The creating of the disambiguated records may be achieved by one or more of: performing data cleansing on one or more of the applicant data and the plurality of independent information to eliminate one or more name variations; and adding metadata record to one or more of the applicant data and the plurality of independent information. In block 712, the method 700 includes determining, with the one or more computer processors, relationships among the disambiguated applicant records. The determining of the relationships may be performed by one or more of: creating a core join data structure with at least a portion of all available disambiguated applicant records; splitting the core join data structure into persisted parts; and clustering one or more of the persisted parts and the disambiguated applicant records. In block 714, the method 700 includes scoring, with the one or more computer processors and based at least in part on the determined relationships among the disambiguated applicant records, at least one parameter of the applicant data. In block 716, the method 700 includes determining, with the one or more computer processors, one or more indicators of fraud based on the scoring of the at least one parameter. In block 718, the method 700 includes outputting, for display, one or more indicators of fraud.

According to an example implementation, the plurality of independent information can include identification information identifying one or more relatives or associates of the plurality of applicants, and wherein the at least one parameter of the applicant data can include a distance between the street address for each of the plurality of applicants and a street address of the one or more relatives or associates. According to an example implementation, the at least one parameter of the applicant data can include a number of records respectively linking the social security numbers and the street addresses for each of the plurality of applicants. According to an example implementation, the at least one parameter of the applicant data can include a number of unique social security numbers associated with the street addresses for each of the plurality of applicants. According to an example implementation, at least one parameter of the applicant data can include a number of sources reporting matching social security numbers and names corresponding to the applicant data received from the first information source. According to an example implementation, the at least one parameter of the applicant data can include a number of other entities associated with the social security numbers of each of the plurality of applicants.

Certain example implementations may further include scoring neighborhood fraud metrics based on the applicant street address based on one or more of: presence of businesses in the surrounding neighborhood, density of housing in the neighborhood; and median income in the neighborhood.

In certain example implementations, the plurality of independent information is not provided by the first information source. In certain example implementations, the plurality of independent information is not provided directly by the plurality of applicants.

In an example implementation, determining the first validity indication of the applicant data may further include determining one or more of: whether one or more of the plurality of applicants is deceased; whether one or more of the plurality of applicants is currently incarcerated; whether one or more of the plurality of applicants has an incarceration record; time since incarceration if the one or more of the plurality of applicants has an incarceration record; and whether one or more of the plurality of applicants has been involved in a bankruptcy.

According to an example implementation, the plurality of independent information can include one or more of: an indication of whether or not one or more of the plurality of applicants is deceased; a date of death when the one or more of the plurality of applicants is indicated as deceased; independent address information associated with the one or more of the plurality of applicants; address validity information associated with the applicant data; one or more records associated with the applicant data; and no information.

In certain example implementations of the disclosed technology, receiving the plurality of independent information comprises receiving one or more records comprising one or more of: housing records, vehicular records, marriage records, divorce records, hospital records, death records, court records, property records, incarceration records, tax records, and utility records, wherein the utility records comprise one or more of utility hookups, disconnects, and associated service addresses.

In certain example implementations of the disclosed technology, receiving the independent address information or the address validity information includes receiving one or more physical addresses of relatives or associates of the entity.

In an example implementation, the one or more public or private databases are independent of the government agency.

In an example implementation, receiving the entity-supplied information includes receiving the name, social security number, and street address associated with a request for a loan, payment, or a benefit from a government agency.

According to exemplary embodiments, certain technical effects are provided, such as creating certain systems and methods that detect fraud related to an applicant for a loan, where the application includes a plurality of applicants. Exemplary embodiments of the disclosed technology can provide the further technical effects of providing systems and methods for determining and eliminating false positives with respect to fraud. Certain example embodiments include technical effects of providing systems and methods for disambiguating input information, resulting in higher quality determinations of fraudulent activities.

In exemplary embodiments of the disclosed technology, the fraud detection system(s) 118 300 may include any number of hardware and/or software applications that are executed to facilitate any of the operations. In exemplary embodiments, one or more I/O interfaces may facilitate communication between the fraud detection system and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the fraud detection system. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the fraud detection system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ enabled network, a Wi-Fi™ enabled network, a satellite-based network any wired network, any wireless network, etc., for communication with external devices and/or systems.

As desired, embodiments of the disclosed technology may include the fraud detection system and/or architecture with more or less of the components illustrated in FIGS. 1-3.

Certain embodiments of the disclosed technology are described above with reference to block and flow diagrams of systems and methods and/or computer program products according to exemplary embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

In the preceding description, numerous specific details have been set forth. However, it is to be understood that embodiments of the disclosed technology may be practiced without these specific details. In other instances, well-known methods, structures and techniques have not been shown in detail in order not to obscure an understanding of this description. The term "exemplary" herein is used synonymous with the term "example" and is not meant to indicate excellent or best. References to "one embodiment," "an embodiment," "exemplary embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

APPENDIX

Salt for Relationship Linking

RELATIONSHIP:relationshipname:BASIS(FieldList):
DEDUP(FieldList)
[:SCORE(FieldList)][:TRACK(FieldList)][:MULTIPLE
(n)][:SPLIT(n)]
[:THRESHOLD(n)][:BLOCKTHRESHOLD(n)]
RELATIONSHIP:relationshipname:RelationshipList
[:MULTIPLE(n)] [:THRESHOLD(n)] [:BLOCKTHRESH-
OLD(n)]
[:LINK(NONE|ALL|DIRECT|CROSS)]

| | |
|---|---|
| relationshipname | User-specified logical name for an entity relationship to be computed in the relationship module |
| BASIS(fieldlist) | Specifies the basis for the relationship using the list of fields specified in the fieldlist parameter. The fieldlist contains a list of field names separated by a colon ':' character which must be equal between record pairs. Fields specified in the fieldlist following a :?: must be equal or null (left.field = right.field or left.field = null or right.field = null). Fields following a :-: implies the fields must not match. Fuzzy matching of fields is not currently supported. |
| DEDUP(fieldlist) | Specifies a list of field names separated by the colon ':' character for deduping when matching record pairs between clusters to compute the relationship count. The DEDUP prevents overcounting when a cluster contains multiple records containing equal basis fields. |

| | -continued |
|---|---|
| | Typically the fieldlist is the same as the fixed portion of the BASIS fieldlist. DEDUP fields must be part of the BASIS. |
| SCORE(fieldlist) | Specifies an optional list of fields separated by the colon ':' character which will be independently scored once per relationship. Fields following a :-: will be negated for the purpose of computing the threshold. SCORE fields cannot be part of the BASIS. |
| TRACK(fieldlist) | Specifies an optional list of RECORDDATE fields, to be used for tracking the dates over which relationship information is gathered. |
| MULTIPLE(n) | Specifies the minimum number of entity links n which must occur before a relationship is declared. |
| SPLIT(n) | Specifies the number of different persists that the main relationship join is split into (default if not specified is 1). Can improve performance and reduce disk space utilization. |
| THRESHOLD(n) | In SALT relationships are scored the same as internal linking, the same internal linking match threshold must be exceeded for a relationship to be declared (counted). The default threshold is the global default for internal linking. The THRESHOLD(n) parameter allows the default value to be overridden. |
| BLOCKTHRESHOLD(n) | BLOCKTHRESHOLD can be used to override the default block threshold used to compute relationships (which is five less than the overall default threshold). Lower numbers = more matches and slower times. |
| LINK(NONE\|ALL\|DIRECT\|CROSS) | The LINK parameter is used to define how a given relationship is used to create link candidates for internal linking. The default is LINK(ALL). If LINK(NONE) is specified, the relationship will not take part in internal linking. If LINK(DIRECT) is specified, the relationship will cause the two sides of the relationship to be considered as possibly two halves of the same entity. If LINK(CROSS) is specified, then if D1 r D2 & D1 r D3, then Cross will cause D2 & D3 to be considered as possible entity link candidates. If LINK(All) is specified, both the DIRECT & CROSS options are evaluated. Note: the relationship basis will be used to SUPPORT the fields of the basis in the matching logic. Thus if you have a BASIS of (fname:lname) - then the NAME concept will be SUPPORTed by whatever the basis score is. This gives a way to get a very strong score for a field match if 2 (or more) relatively weak values for that field match between two entities. (For a fuller explanation of SUPPORT - see ATTRIBUTEFILE) |
| RelationshipList | The second form of the RELATIONSHIP statement allows a relationship to be formed as the sum of other relationships. The RelationshipList parameter allows a list of relationship names separated by the colon ':' character to be specified. |

SALT internal linking provides the capability to cluster together records to form an entity. In some situations, the objective is not to determine that two records or clusters are close enough to become part of the same entity, but to determine if a statistically significant link exists between the two clusters and to record this relationship. The RELATIONSHIP statement provides this function.

When clustering single entities using SALT internal linking, there may be insufficient information within one record to perform a link even with propagation of field values. SALT internal linking will leave those records unmatched. Relationships provide a way to record instances when multiple occurrences of specific set of fields (the BASIS field list) matching between clusters provide an additional clue that a match may exist. For example, when a name match isn't strong, but a first name, middle name and two different last names matching between clusters is becoming a lot stronger. Relationships are not currently used automatically as part of SALT linking, however using the RELATIONSHIP statement SALT can produce an additional relationship file that can be used to create an ATTRIBUTEFILE as input to another SALT process. For example, if you have a relationship between entity ID1 and ID2, the relationship file can be deduped and projected so that ID1 ⊠ ID2 and ID2 ⊠ ID1 are both in the file, then use an ATTRIBUTEFILE statement that declares one ID as the IDFIELD and the other ID as the VALUES field. See description below of the output format for a relationship file.

The core part of a SALT relationship is the BASIS; the basis is the list of fields which must be identical between two clusters for a linkage to exist. Fields following a :?: field in the basis field list must be identical or one must be null. Thus a relationship which counts and weighs the number of shared addresses between two clusters could be:

RELATIONSHIP:COHABIT:BASIS(PRIM_NAME: PRIM_RANGE:CITY_NAME:ST:?: SEC_RANGE)

Note that the sec-range comes after the :?: that defines that either they must be equal or one must be null.

You can also a ATTRIBUTEFILE VALUES field as part of the BASIS for a relationship.

As it stands this would count all of the record-pairs between two clusters which match, however if a cluster had two or more copies of an address it could double count. To avoid this issue you also specify a DEDUP criteria as a field list to dedup. It would be normal for the DEDUP criteria to be the same as the fixed portion of the basis. However for addresses there can often be multiple names for one road and multiple ways of expressing one city. Thus it is usually safest to simply dedup using the prim_range. For example:
RELATIONSHIP:COHABIT:BASIS(PRIM_NAME: PRIM_RANGE:CITY_NAME:ST:?: SEC_RANGE): DEDUP(PRIM_RANGE)

It should be noted that the DEDUP performs a smart dedup, it will actually look for the strongest link found for a given value of a DEDUP field. In the example presented above, if a link had been found with and without the sec_range it will use the one which includes the sec-range value. If DEDUP is omitted, it defaults to the whole of the basis. SALT also checks to insure that all DEDUP elements are from the BASIS definition.

Within SALT relationship fields are scored the same as in internal linking and by default a linkage is declared if the internal linking match threshold is exceeded. This can be overridden using the THRESHOLD parameter on the RELATIONSHIP statement. As addresses usually have a specificity of around 28 it will generally then take 2 or more to cause a relationship to be declared. If you wish to force that a certain number of different links need to be found between clusters before declaring a relationship then you can use the :MULTIPLE(n) option. Here n is the minimum number of linkages that must have been found. A linkage occurs between any two entity identifiers which share a common value for a given basis.

Sometimes you want to be able to use other information in the record outside of the basis to support the declaration of a linkage but without requiring it as part of the basis. For example, sharing of one address between two identifiers is probably not significant but if the identifiers also share an SSN or share a last name there is more likelihood of a relationship. These supporting fields can be declared using the SCORE parameter on the RELATIONSHIP statement with its associated field list. For example:
RELATIONSHIP:COHABIT:BASIS(PRIM_NAME: PRIM_RANGE:CITY_NAME:ST:?:SEC_RANGE): DEDUP(PRIM_RANGE):SCORE(SSN:LNAME)

The fields in the score list are independent and will be maximized across all of the linkages taking part in one relationship (if more than one RELATIONSHIP statement have the same field in the SCORE list, the highest score for that field will be used for all RELATIONSHIP statements). An issue with relationships is getting them to run in a reasonable amount of time. Relationships are the classical n-squared process and the n-squared is true of both time and disk space. SALT does a lot of work to optimize this process which results in a light-weight self-joins being used in the generated ECL, but disk-space utilization could still be high. The SPLIT(n) parameter on the RELATIONSHIP statement allows the core join to be split into parts each of which is persisted. This has the advantage of breaking a potentially very long join into n parts (allowing others a time slice) but also reduces disk consumption by a factor of n (provided the eventual links are fairly sparse). In terms of performance it should be noted that if n can be made high enough that the output of each join does not spill to disk then the relationship calculation process will have significantly faster performance. The following example shows the use of the SPLIT (n) parameter:

RELATIONSHIP:COHABIT:BASIS(PRIM_NAME: PRIM_RANGE:CITY_NAME:ST:?:SEC_RANGE):SPLIT (16):SCORE(LNAME:SSN):DEDUP(PRIM_RANGE)

It is possible to have multiple RELATIONSHIP statements defined in one specification file. Each RELATIONSHIP is independently computed. The output for the relationship specified will be in the following format:

```
CombinationRecord := RECORD
   unsigned6 ID1;
   unsigned6 ID2;
   unsigned2 Basis_score;        // Score allocated to the basis relation-
                                 ship
   unsigned2 Dedup_Val;          // Hash will be stored in here to dedup
   unsigned2 Cnt;   // Number of different basis matches shared between
                    // clusters
   unsigned1 LNAME_score;        // Independent score for the LNAME
                                 field
   unsigned1 SSN_score;          // Independent score for the SSN field
END;
```

ID1 and ID2 are the entity IDs being linked. The Basis_score is the accumulated score across all of the (deduped) basis matches that form the relationship. The Dedup_Val field is used for computation and may be ignored. Cnt is the number of different basis matches being used in the relationship. Then will come a score for each score field which has been maximized across all the basis matches in the relationship. The total score used to determine whether or not the matching threshold is exceeded is
Basis_score+Lname_score+SSN_score.

Any field (BASIS or SCORE) which is part of a CONCEPT definition will be weighted appropriately when used inside BASIS or SCORE.

Relationships and Dates

It is possible to track the dates over which relationship information is gathered; provided you have RECORDDATE fields in your SPC. Any relationship can have a track list. TRACKing is there to provide date information about the relationship—it does NOT change the relationship computation in any way (other than possibly making it a little slower). For example:

```
RELATIONSHIP:COHABIT:BASIS(PRIM_NAME:PRIM_RANGE:
CITY_NAME:ST:?:SEC_RANGE):SCORE(LNAME:SSN):
DEDUP(PRIM_RANGE):THRESHOLD(35):
TRACK(dt_first_seen:dt_last_seen)
RELATIONSHIP:CONAME:BASIS(FNAME:LNAME):MULTIPLE(2):
TRACK(dt_first_seen:dt_last_seen)
```

The system will then track for a 'first' date—the first date that BOTH elements of a relationship have a fact. For a 'last' date in is the last date that BOTH elements of a relationship share that fact. If a relationship is based upon multiple co-incidences it will find the earliest shared fact for a 'first' date and the latest shared fact for a last date. This is a slightly weird combination of mins and maxes—but semantically it works. As an example:
   A lives at 123 Main Street from 19800101 to 19900101
   B lives at 123 Main Street from 19850101 to 19870101
   A lives at 456 High Street from 19900101 to 20000101
   B lives at 456 High Street from 19870101 to 20100101
The system first computes the 'fact coincidence dates:
   A&B share 123 Main Street from 19850101 to 19870101
     (the shorter range when both are there)
   A&B share 456 High Street from 19900101 to 200000101
     (the shorter range when both are there)

Now the EARLIEST shared fact date is 19850101 and the latest shared fact date is 20000101. These represent an UPPER bound on the start of the relationship and a lower bound on the end of it.
NOTE: if shared facts do NOT overlap in time it is possible for the 'first' date to be after the 'last' date.
It is also possible to enforce some degree of date overlap within a single relationship. This is done by defining a RANGE field upon the two record dates. eg:

```
FIELD:dt_first_seen:RECORDDATE(FIRST,YYYYMM):5,0
FIELD:dt_last_seen:RECORDDATE(LAST,YYYYMM):5,0
RANGEFIELD:ReportedDate:RANGE(dt_first_seen,dt_last_seen):5,0
```

The two record-dates may be TRACKed if required (or not). ReportedDate can now be used as a (fairly) 'regular' field in the basis or score portion of a relationship. eg:

```
RELATIONSHIP:COHABIT:BASIS(PRIM_NAME:PRIM_RANGE:
CITY_NAME:ST:?:SEC_RANGE):SCORE(SSN:LNAME:
REPORTEDDATE):DEDUP(PRIM_RANGE):THRESHOLD(35):
TRACK(dt_first_seen:dt_last_seen)
RELATIONSHIP:CONAME:BASIS(FNAME:LNAME:?:REPORTED-
DATE):
MULTIPLE(2):TRACK(dt_first_seen)
RELATIONSHIP:COSSN:BASIS(SSN:REPORTEDDATE):
SCORE(LNAME):THRESHOLD(35):TRACK(dt_last_seen)
```

Notes:
1. In a score the Global specificity for a date overlap is used (same as in internal linking)
2. In the optional portion of a basis—the dates can overlap OR one record not have a date
3. In the fixed portion of a basis—there MUST be overlap in the dates. NOTE: A range field CANNOT be the ONLY (or FIRST) element of a basis
Combining Relationships with Different BASIS into a Single Relationship
It is also possible to define a relationship based upon other relationships. This is done using the relationship list. All relationships in the list must be normal relationships, grandparents are not allowed. This definition uses the second form of the RELATIONSHIP statement. Consider the following example which combines a COHABIT relationship with a COSSN relationship to form an association:

```
RELATIONSHIP:COHABIT:BASIS(PRIM_NAME:PRIM_RANGE:
CITY_NAME:ST:?:SEC_RANGE):SPLIT(16):SCORE(LNAME:SSN):
DEDUP(PRIM_RANGE):THRESHOLD(30)
RELATIONSHIP:COSSN:BASIS(SSN):SCORE(LNAME):DEDUP(SSN):)
MULTIPLE(2
RELATIONSHIP:ASSOC:COHABIT:COSSN
```

This has two normal relationships and one that associates the other two together into a unified score. It should be noted that because the normal relationships are eventually going to be wired together by an association, you may need to weaken them as shown in the example using the THRESHOLD statement. Thus the THRESHOLD(30) on COHABIT may be enough to capture a very rare single address (40 is the typical person threshold in the LexisNexis person data). For COSSN the MULTIPLE(2) parameter forces pairs of matching SSN for a relationship; this is an efficiency gained from the fact that a single SSN match is already being caught be the SCORE on COHABIT.
In principle ASSOC then simply combines the two underlying relationships together and adds the scores; it is therefore very efficient and uses the stored results of the two normal relationships. However there is an issue in that between the child relationships there can easily be a lot of double-counting occurring because either:
  a) Two relationships have identical fields in the SCORE attribute (in this case both have LNAME)
  b) The SCORE attribute of one relationship might be part of the basis of another relationship (in this case COHABIT scores SSN which is part of the basis of COSSN)
SALT automatically picks this apart and:
  a) Only picks the best score when multiple SCOREs clash
  b) Assigns the SCORE from one relationship to the basis field of the other relationship and then does a MAX across those. (This is how a single SSN match gets picked up even though it is forbidden in COSSN).
Then the MULTIPLE and THRESHOLD parameters (or defaults) are applied to the child relationship. Thus a MULTIPLE(3) will require 3 different data matches to have occurred between COHABIT and COSSN.
A lot of the detail of the child relationships is preserved in the output generated for a combined relationship. The format for the ASSOC example would be:

```
shared ASSOCCRec := RECORD
    unsigned6 ID1;
    unsigned6 ID2;
    unsigned2 Total_Score := 0;
    unsigned2 Total_Cnt := 0;
    unsigned2 COHABIT_score := 0;
    unsigned1 COHABIT_cnt := 0;
    unsigned2 COSSN_score := 0;
    unsigned1 COSSN_cnt := 0;
    unsigned1 LNAME_score := 0;
    // Score for SSN will be rolled into COSSN as it is part of basis
END;
```

Individual keys are also built by SALT for all relationships which are of included as part of another relationship. In addition, a relationship service is built for each relationship that is not the child of another one. This service takes a UID (unique id) and a depth and will produce rolled up data for every relationship in the tree that many levels deep. The tree walking aspect of this service is in the relationship_links module. The tree is walked so that each level of the tree is joined to the branch before via the strongest link. At each level the ID1 is the node being walked from and the ID2 is the node being walked to. The original node appears as a level 0 entry in ID2.
For example, using the Sample_Input_File_Internal_A-F_Relationship_SPC specification file in the SALT_Examples module for internal linking produces the following results:

| Result 1 | [2 rows] | .zip | .gz | .xls | key::salt test7::bdid::rel::cotein |
| Result 2 | [120 rows] | .zip | .gz | .xls | key::salt test7::bdid::rel::assoc |
| Match Sample Records | [459 rows] | .zip | .gz | .xls | |
| Slice Out Candidates | [14 rows] | .zip | .gz | .xls | |
| Specificities | [1 rows] | .zip | .gz | .xls | |

-continued

| | | | | |
|---|---|---|---|---|
| SPC Shift | [1 rows] | .zip | .gz | .xls |
| Pre Clusters | [111 rows] | .zip | .gz | .xls |
| Post Clusters | [111 rows] | .zip | .gz | .xls |
| Pre Cluster Count | [1 rows] | .zip | .gz | .xls |
| Post Cluster Count | [1 rows] | .zip | .gz | .xls |
| Matches Performed | 305 | | | |
| Basic Matches Performed | 132 | | | |
| Slices Performed | 14 | | | |
| Rule Efficacy | [2 rows] | .zip | .gz | .xls |
| Confidence Levels | [23 rows] | .zip | .gz | .xls |
| Propagation Assisted Pcnt | 17.04918032786885 | | | |
| Propagation Required Pcnt | 5.573770491803279 | | | |
| Pre Pop Stats | [1 rows] | .zip | .gz | .xls |
| Post Pop Stats | [1 rows] | .zip | .gz | .xls |
| Validity Statistics | [1 rows] | .zip | .gz | .xls |
| Id Consistency0 | [1 rows] | .zip | .gz | .xls |
| Result 22 | [1 rows] | .zip | .gz | .xls | key::salt test7::bdid::debug::specificities debug |
| Result 23 | [148375 rows] | .zip | .gz | .xls | key::salt test7::bdid::debug::match candidates debug |
| Result 24 | [152 rows] | .zip | .gz | .xls | key::salt test7::bdid::datafile::attribute matches |
| Result 25 | [437 rows] | .zip | .gz | .xls | key::salt test7::bdid::debug::match sample debug |
| Result 26 | [148375 rows] | .zip | .gz | .xls | key::salt test7::bdid::datafile::patched candidates |
| Result 27 | [151475 rows] | .zip | .gz | .xls | temp::bdid::salt test7::it1 |
| Result 28 | [6620 rows] | .zip | .gz | .xls | temp::bdid::salt test7:changes it1 |

Result 1 is the file produced by the COFEIN relationship. This file contains the following results:

| | bdid1 | bdid2 | basis score | dedup val | cnt | company name score |
|---|---|---|---|---|---|---|
| 1 | 37178850 | 292680203 | 22 | 54286 | 2 | 11 |
| 2 | 292680203 | 37178850 | 22 | 54286 | 2 | 11 |

Result 2 is the file produced by the top-level relationship called ASSOC. contains the following results:

| | bdid1 | bdid2 | colocate score | colocate cnt | cofein score | cofein cnt | company name score | total cnt | total score |
|---|---|---|---|---|---|---|---|---|---|
| 1 | 28318440 | 81815873 | 12 | 1 | 0 | 0 | 11 | 1 | 23 |
| 2 | 37178850 | 292680203 | 0 | 0 | 22 | 2 | 11 | 2 | 33 |
| 3 | 41434192 | 42443948 | 13 | 1 | 0 | 0 | 11 | 1 | 24 |
| 4 | 42443948 | 41434192 | 13 | 1 | 0 | 0 | 11 | 1 | 24 |
| 5 | 81815873 | 28318440 | 12 | 1 | 0 | 0 | 11 | 1 | 23 |
| 6 | 82061141 | 286051048 | 9 | 1 | 11 | 0 | 8 | 1 | 28 |
| 7 | 175223914 | 387316952 | 12 | 1 | 0 | 0 | 11 | 1 | 23 |
| 8 | 286051048 | 82061141 | 9 | 1 | 11 | 0 | 8 | 1 | 28 |
| 9 | 292680203 | 37178850 | 0 | 0 | 22 | 2 | 11 | 2 | 33 |
| 10 | 387316952 | 175223914 | 12 | 1 | 0 | 0 | 11 | 1 | 23 |
| 11 | 408311407 | 408973906 | 12 | 1 | 0 | 0 | 11 | 1 | 23 |
| 12 | 408973905 | 408311407 | 12 | 1 | 0 | 0 | 11 | 1 | 23 |
| 13 | 427653229 | 994817609 | 10 | 1 | 11 | 0 | 4 | 1 | 26 |
| 14 | 994817609 | 427653229 | 10 | 1 | 11 | 0 | 4 | 1 | 25 |

The invention claimed is:

1. A computer-implemented method comprising:
receiving, from a first information source, applicant data associated with a loan application having a plurality of applicants, wherein the applicant data comprises at least a name, a social security number, and a street address for each of the plurality of applicants;
querying one or more of a public database and a private database with at least a portion of the applicant data;
receiving, from a second information source that is independent of the first information source, a plurality of independent information in response to the querying;
determining, with one or more computer processors in communication with a memory, based at least in part on a comparison of the applicant data with at least a portion of the plurality of independent information, a first validity indication of the applicant data;
creating, with the one or more computer processors, disambiguated applicant records responsive to the first validity indication by one or more of:
performing data cleansing on one or more of the applicant data and the plurality of independent information to eliminate one or more name variations; and
adding metadata record to one or more of the applicant data and the plurality of independent information;
determining, with the one or more computer processors, relationships among the disambiguated applicant records by one or more of:
creating a core join data structure with at least a portion of all available disambiguated applicant records;

splitting the core join data structure into persisted parts; and clustering one or more of the persisted parts and the disambiguated applicant records;

scoring, with the one or more computer processors and based at least in part on the determined relationships among the disambiguated applicant records, at least one parameter of the applicant data;

determining, with the one or more computer processors, one or more indicators of fraud based on the scoring of the at least one parameter; and outputting, for display, one or more indicators of fraud.

2. The method of claim 1, wherein the plurality of independent information includes identification information identifying one or more relatives or associates of the plurality of applicants, and wherein the at least one parameter of the applicant data comprises a distance between the street address for each of the plurality of applicants and a street address of the one or more relatives or associates.

3. The method of claim 1, wherein the at least one parameter of the applicant data comprises a number of records respectively linking the social security numbers and the street addresses for each of the plurality of applicants.

4. The method of claim 1, wherein the at least one parameter of the applicant data comprises a number of unique social security numbers associated with the street addresses for each of the plurality of applicants.

5. The method of claim 1, wherein the at least one parameter of the applicant data comprises a number of sources reporting matching social security numbers and names corresponding to the applicant data received from the first information source.

6. The method of claim 1, wherein the at least one parameter of the applicant data comprises a number of other entities associated with the social security numbers of each of the plurality of applicants.

7. The method of claim 1, wherein the plurality of independent information is not provided by the first information source.

8. The method of claim 1, wherein determining the first validity indication of the applicant data further comprises determining one or more of: whether one or more of the plurality of applicants is deceased; whether one or more of the plurality of applicants is currently incarcerated; whether one or more of the plurality of applicants has an incarceration record; time since incarceration if the one or more of the plurality of applicants has an incarceration record; and whether one or more of the plurality of applicants has been involved in a bankruptcy.

9. The method of claim 1, wherein the plurality of independent information includes one or more of: an indication of whether or not one or more of the plurality of applicants is deceased; a date of death when the one or more of the plurality of applicants is indicated as deceased; independent address information associated with the one or more of the plurality of applicants; address validity information associated with the applicant data; one or more records associated with the applicant data; and no information.

10. The method of claim 1, wherein receiving the plurality of independent information comprises receiving one or more records comprising one or more of housing records, vehicular records, marriage records, divorce records, hospital records, death records, court records, property records, incarceration records, tax records, and utility records, wherein the utility records comprise one or more of utility hookups, disconnects, and associated service addresses.

11. The method of claim 1, wherein receiving the independent information comprises receiving one or more physical addresses of relatives or associates of one or more of the plurality of applicants.

12. The method of claim 1, wherein the one or more public or private databases are independent of a government agency.

13. A system comprising:

at least one memory for storing data and computer-executable instructions; and at least one processor configured to access the at least one memory and further configured to execute the computer-executable instructions to:

receive, from a first information source, applicant data associated with a loan application having a plurality of applicants, wherein the applicant data comprises at least a name, a social security number, and a street address for each of the plurality of applicants;

query one or more of a public database and a private database with at least a portion of the applicant data;

receive, from a second information source that is independent of the first information source, a plurality of independent information in response to the querying;

determine, with the at least one processor, based at least in part on a comparison of the applicant data with at least a portion of the plurality of independent information, a first validity indication of the applicant data;

create, with the at least one processor, disambiguated applicant records responsive to the first validity indication by one or more of:

performing data cleansing on one or more of the applicant data and the plurality of independent information to eliminate one or more name variations; and adding metadata record to one or more of the applicant data and the plurality of independent information;

determine, with the at least one processor, relationships among the disambiguated applicant records by one or more of:

creating a core join data structure with at least a portion of all available disambiguated applicant records;

splitting the core join data structure into persisted parts; and clustering one or more of the persisted parts and the disambiguated applicant records;

score, with the at least one processor and based at least in part on the determined relationships among the disambiguated applicant records, at least one parameter of the applicant data;

determine, with the one or more computer processors, one or more indicators of fraud based on the score of the at least one parameter; and output, for display, one or more indicators of fraud.

14. The system of claim 13, wherein the plurality of independent information includes identification information identifying one or more relatives or associates of the plurality of applicants, and wherein the at least one parameter of the applicant data comprises one or more of:

a distance between the street address for each of the plurality of applicants and a street address of the one or more relatives or associates;

a number of records respectively linking the social security numbers and the street addresses for each of the plurality of applicants;

a number of unique social security numbers associated with the street addresses for each of the plurality of applicants;

a number of sources reporting matching social security numbers and names corresponding to the applicant data received from the first information source; and a number of other entities associated with the social security numbers of each of the plurality of applicants.

15. The system of claim 13, wherein the plurality of independent information is not provided by the first information source.

16. The system of claim 13, wherein the first validity indication of the applicant data includes a determination of: whether one or more of the plurality of applicants is deceased; whether one or more of the plurality of applicants is currently incarcerated; whether one or more of the plurality of applicants has an incarceration record; time since incarceration if the one or more of the plurality of applicants has an incarceration record; and whether one or more of the plurality of applicants has been involved in a bankruptcy.

17. The system of claim 13, wherein the plurality of independent information includes one or more of housing records, vehicular records, marriage records, divorce records, hospital records, death records, court records, property records, incarceration records, tax records, and utility records, wherein the utility records comprise one or more of utility hookups, disconnects, and associated service addresses.

18. The system of claim 13, wherein the plurality of independent information includes one or more of: an indication of whether or not one or more of the plurality of applicants is deceased; a date of death when the one or more of the plurality of applicants is indicated as deceased; independent address information associated with the one or more of the plurality of applicants; address validity information associated with the applicant data; one or more records associated with the applicant data; and no information.

19. The system of claim 13, wherein the independent information comprises one or more physical addresses of relatives or associates of one or more of the plurality of applicants.

20. One or more computer readable media comprising computer-executable instructions that, when executed by one or more processors, configure the one or more processors to perform the method of:

receiving, from a first information source, applicant data associated with a loan application having a plurality of applicants, wherein the applicant data comprises at least a name, a social security number, and a street address for each of the plurality of applicants;

querying one or more of a public database and a private database with at least a portion of the applicant data;

receiving, from a second information source that is independent of the first information source, a plurality of independent information in response to the querying;

determining, with one or more computer processors in communication with a memory, based at least in part on a comparison of the applicant data with at least a portion of the plurality of independent information, a first validity indication of the applicant data;

creating, with the one or more computer processors, disambiguated applicant records responsive to the first validity indication by one or more of:

performing data cleansing on one or more of the applicant data and the plurality of independent information to eliminate one or more name variations; and adding metadata record to one or more of the applicant data and the plurality of independent information;

determining, with the one or more computer processors, relationships among the disambiguated applicant records by one or more of:

creating a core join data structure with at least a portion of all available disambiguated applicant records;

splitting the core join data structure into persisted parts; and clustering one or more of the persisted parts and the disambiguated applicant records;

scoring, with the one or more computer processors and based at least in part on the determined relationships among the disambiguated applicant records, at least one parameter of the applicant data;

determining, with the one or more computer processors, one or more indicators of fraud based on the scoring of the at least one parameter; and outputting, for display, one or more indicators of fraud.

* * * * *